United States Patent
Deimen et al.

[11] Patent Number: 5,971,509
[45] Date of Patent: Oct. 26, 1999

[54] MODULAR POWER AND CABLE DISTRIBUTION SYSTEM

[75] Inventors: Michael L. Deimen, Burleson; Subur Tjandra, Arlington; Erik Nielsen, Euless, all of Tex.; Karl J. Mead, Grand Rapids, Mich.; Robert L. Stewart, Grapevine, Tex.; Thomas F. Crissler, Arlington, Tex.; Ting-Wen Nieh, Arlington, Tex.

[73] Assignee: Steelcase Inc., Grand Rapids, Mich.

[21] Appl. No.: 08/775,256

[22] Filed: Dec. 30, 1996

Related U.S. Application Data

[63] Continuation-in-part of application No. 08/649,212, May 17, 1996.

[51] Int. Cl.⁶ .................................................. H02B 1/20
[52] U.S. Cl. ................................. 312/223.6; 108/50.02; 108/26; 248/58; 174/48; 403/298; 403/292; 403/295; 403/293
[58] Field of Search ......................... 312/223.6, 223.3, 312/223.4, 223.5, 223.1, 246, 194; 108/50.02, 23, 25, 26, 27; 248/58, 63, 68.1, 73; 174/48, 49; 361/832, 826, 827; 403/298, 292, 295, 293; 256/65, 59

[56] References Cited

U.S. PATENT DOCUMENTS

| | | |
|---|---|---|
| 1,025,759 | 5/1912 | Cluskey .............................. 403/298 X |
| 3,246,433 | 4/1966 | Eriksson .............................. 403/292 X |
| 3,497,281 | 2/1970 | Wilde . | 
| 3,762,116 | 10/1973 | Anderson et al. ........................ 52/239 |
| 4,155,310 | 5/1979 | Gregory . |
| 4,593,505 | 6/1986 | Russell .................................. 174/49 X |
| 4,654,756 | 3/1987 | Wilson et al. . |
| 4,734,826 | 3/1988 | Wilson et al. .......................... 361/827 |
| 4,792,881 | 12/1988 | Wilson et al. . |
| 4,879,955 | 11/1989 | Moll et al. ............................... 108/50 |
| 4,918,886 | 4/1990 | Benoit et al. ........................ 174/48 X |
| 5,001,877 | 3/1991 | Edwards ............................. 403/298 X |
| 5,094,174 | 3/1992 | Grund et al. . |
| 5,103,741 | 4/1992 | Grund et al. . |
| 5,144,896 | 9/1992 | Fortsch . |
| 5,252,086 | 10/1993 | Russell et al. . |
| 5,336,849 | 8/1994 | Whitney .................................... 174/48 |
| 5,362,923 | 11/1994 | Newhouse et al. ....................... 174/48 |

FOREIGN PATENT DOCUMENTS 462920   12/1991   European Pat. Off. ............ 312/223.6

Primary Examiner—Peter M. Cuomo
Assistant Examiner—Janet M. Wilkens
Attorney, Agent, or Firm—Price, Heneveld, Cooper Dewitt & Litton

[57] ABSTRACT

A modular power and cable distribution system includes an elongate member having a top flange which is configured to be mounted to a worksurface, a vertical web extending downwardly from the top flange, and a bottom flange which includes a connector configured to detachably support at least one of a trough mounted laterally adjacent to the elongate member, a closure panel which together with the elongate member defines an enclosed powerway, and a modesty panel depending from the elongate member. The disclosed power and cable distribution system includes alignment members for facilitating and maintaining proper alignment of adjacent elongate members mounted on connected worksurfaces, gap trim pieces for covering gaps between adjacent, aligned powerways and/or cableways, and an infeed trim piece for feeding conduits or cables into the distribution system.

26 Claims, 13 Drawing Sheets

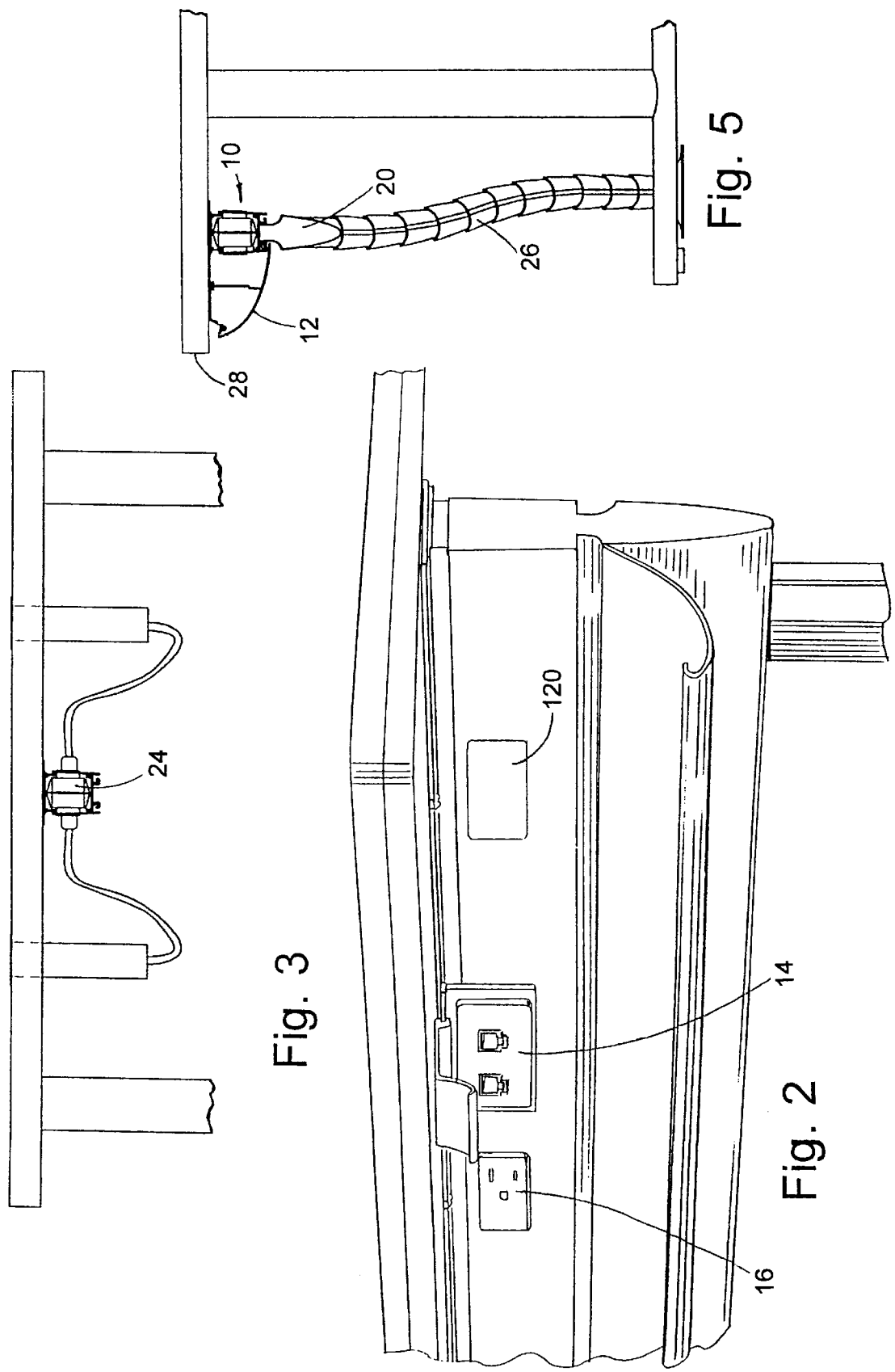

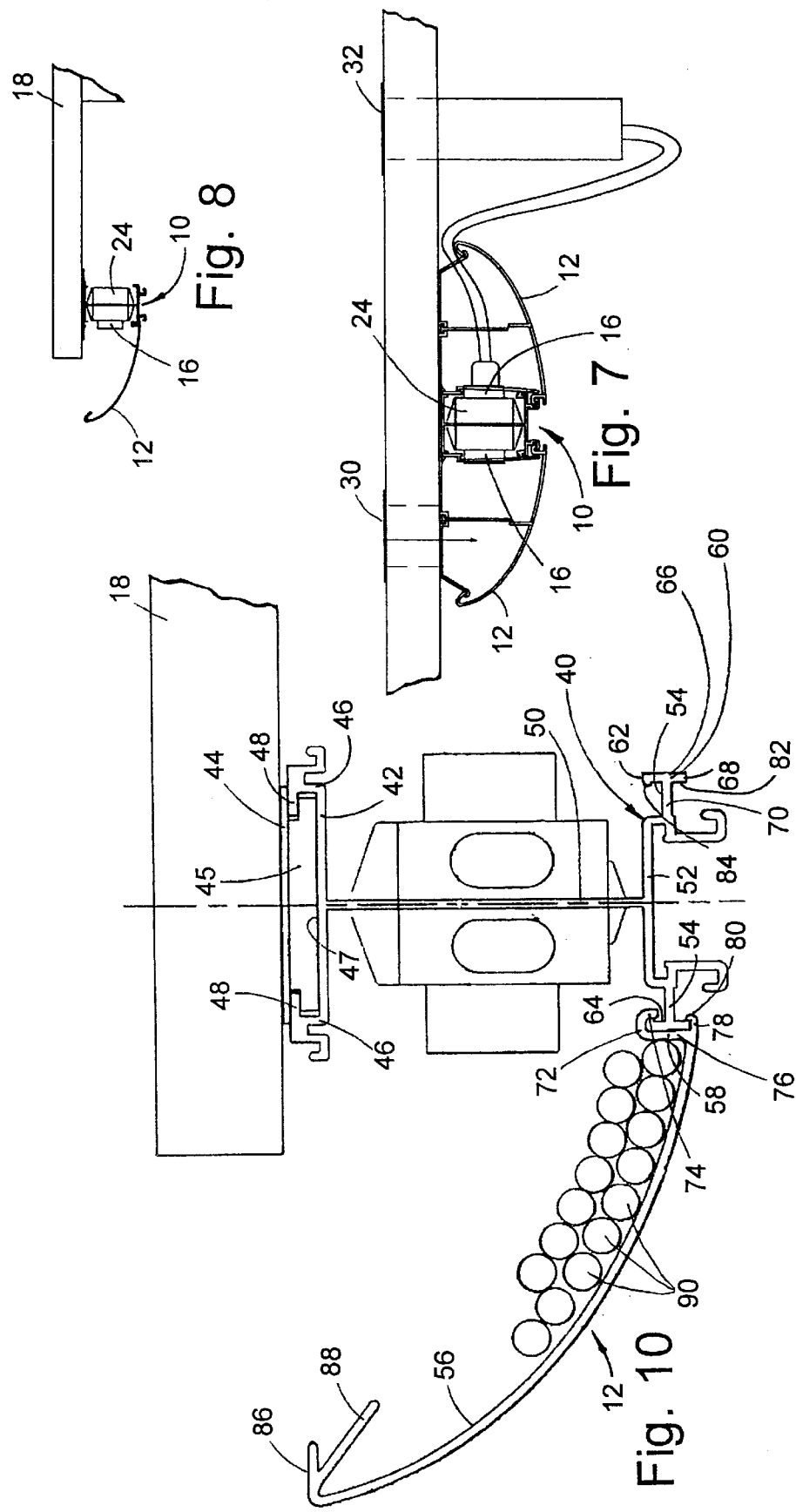

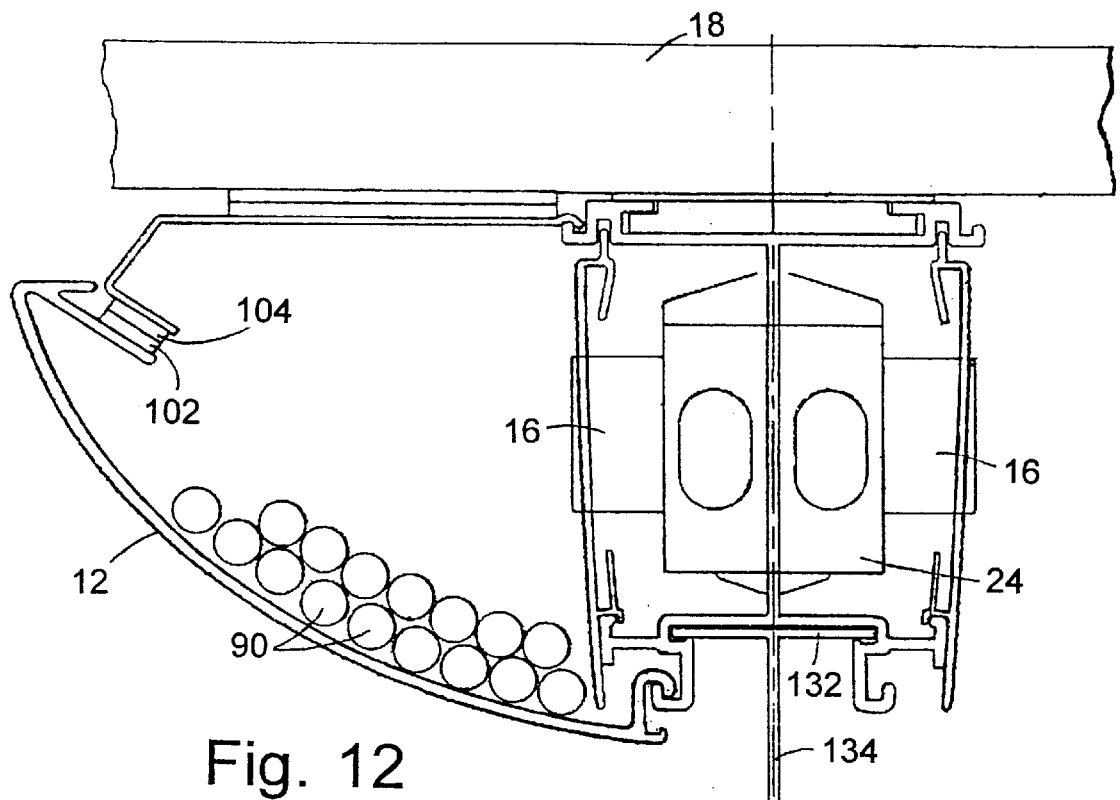
Fig. 12
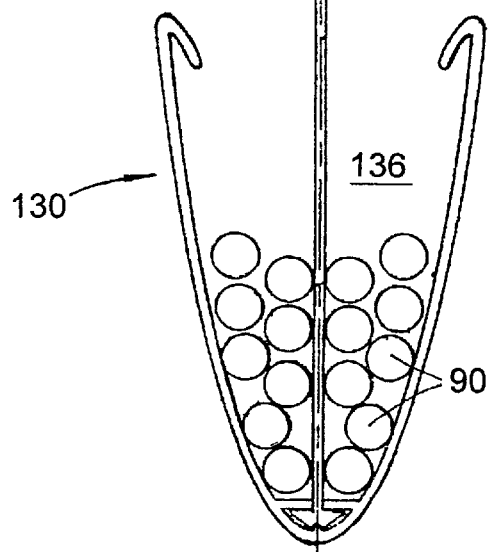

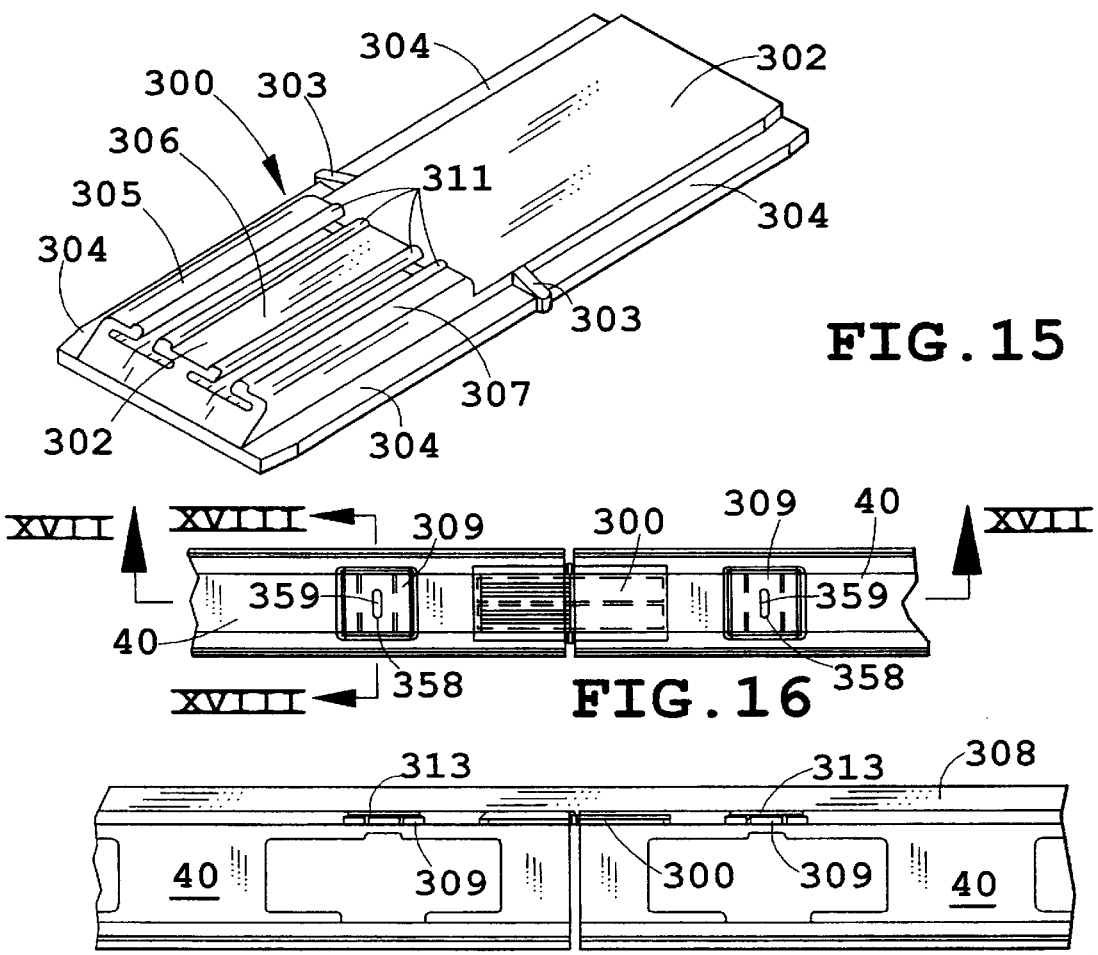
FIG. 15
FIG. 16
FIG. 17
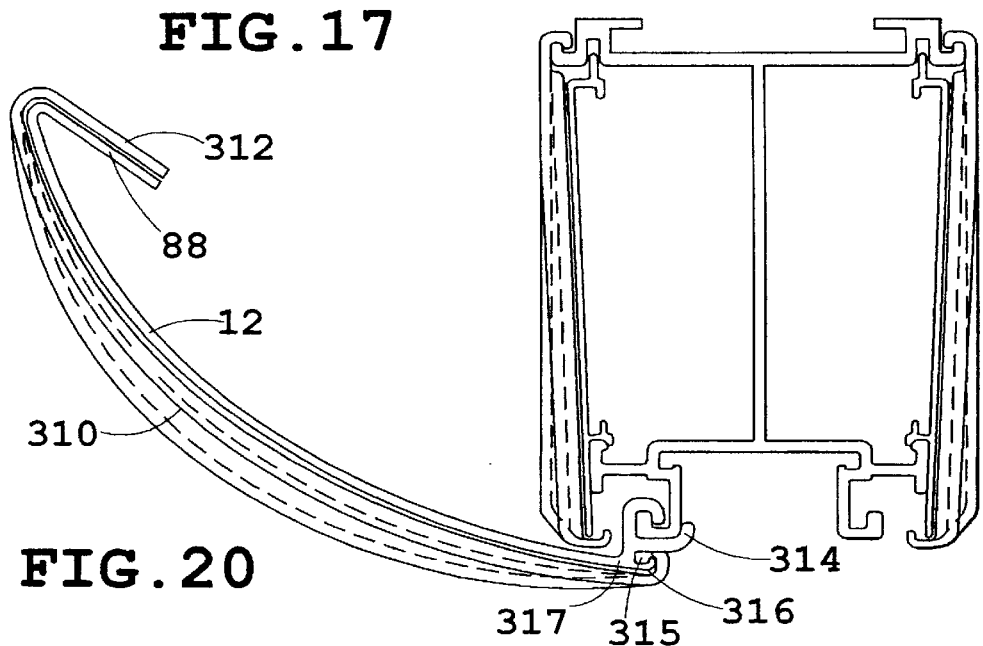
FIG. 20

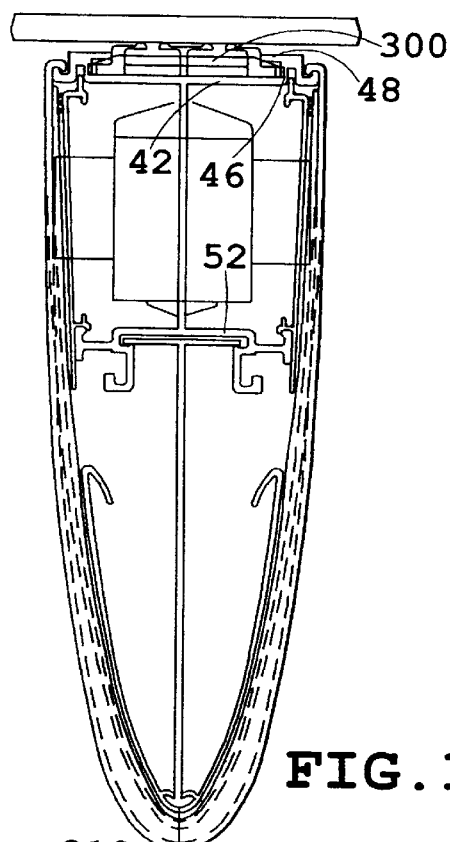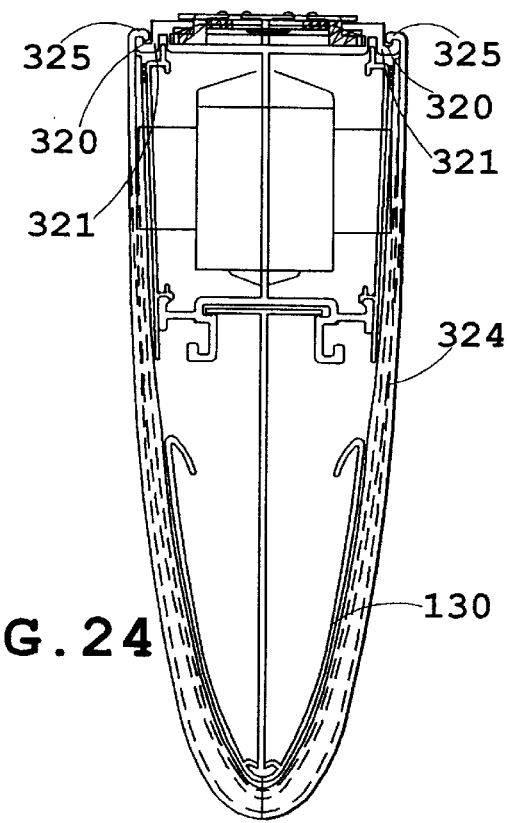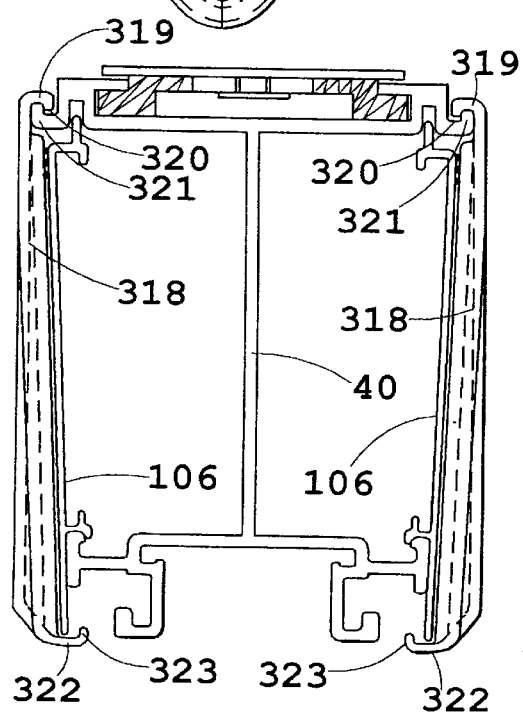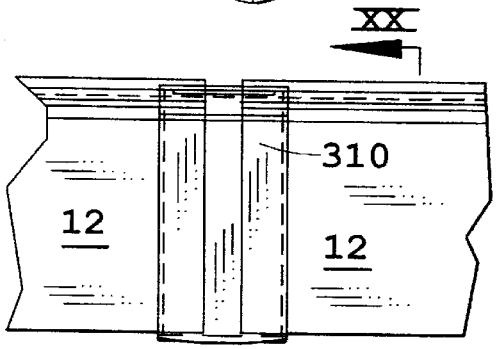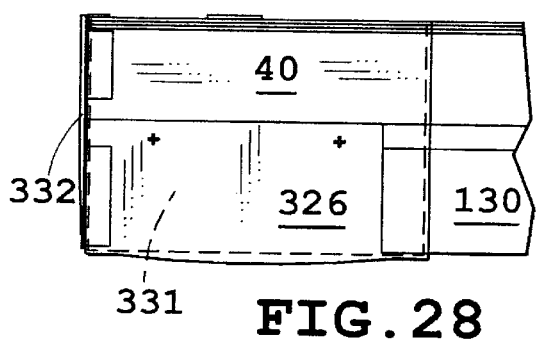

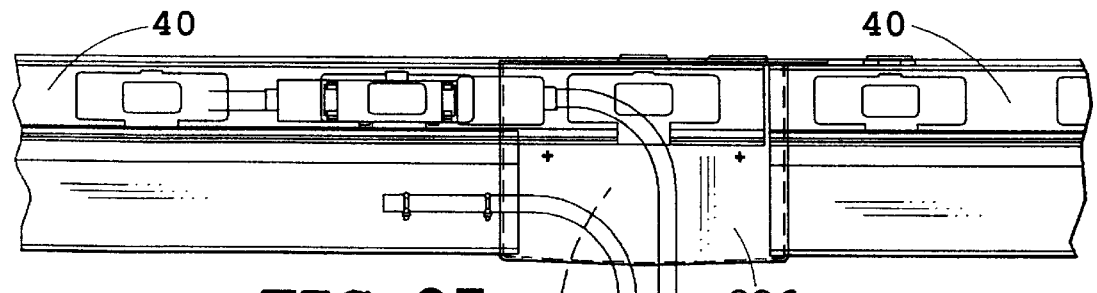
FIG. 27
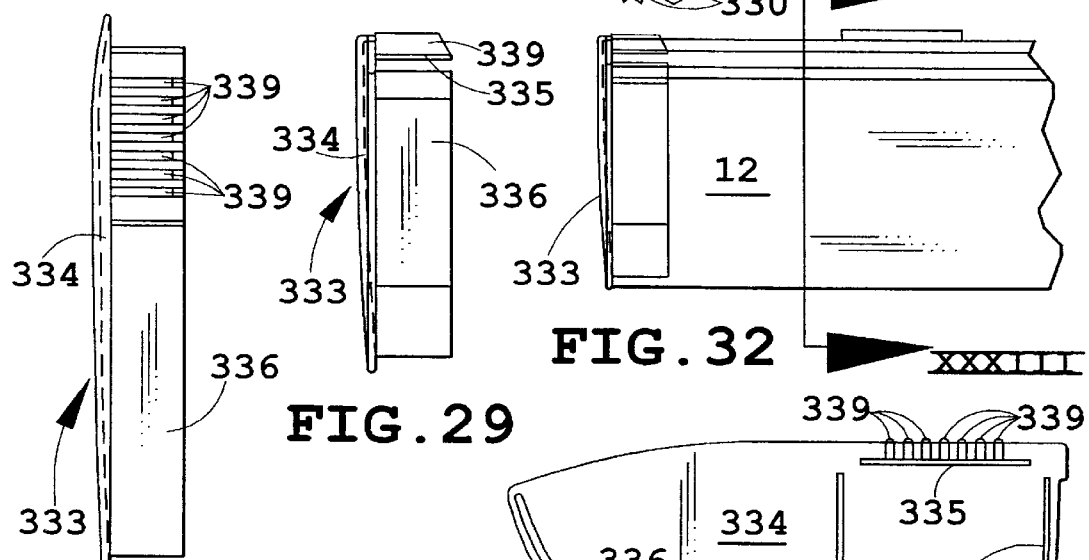
FIG. 29
FIG. 31
FIG. 32
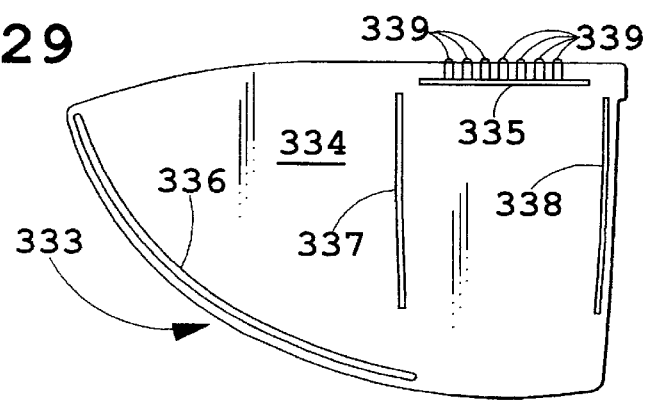
FIG. 30
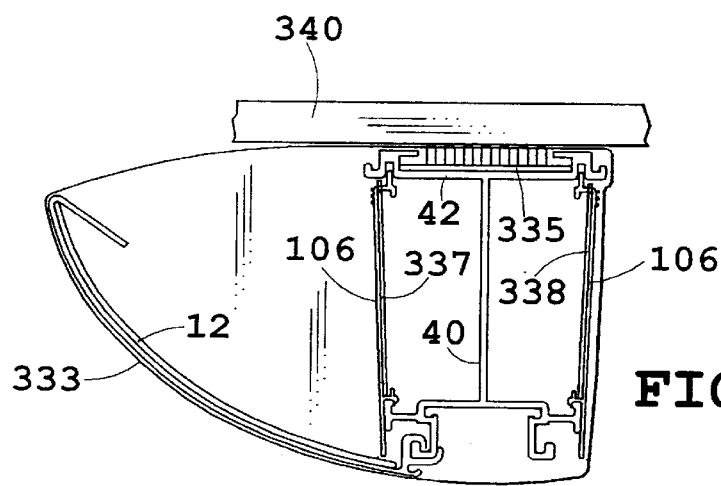
FIG. 33

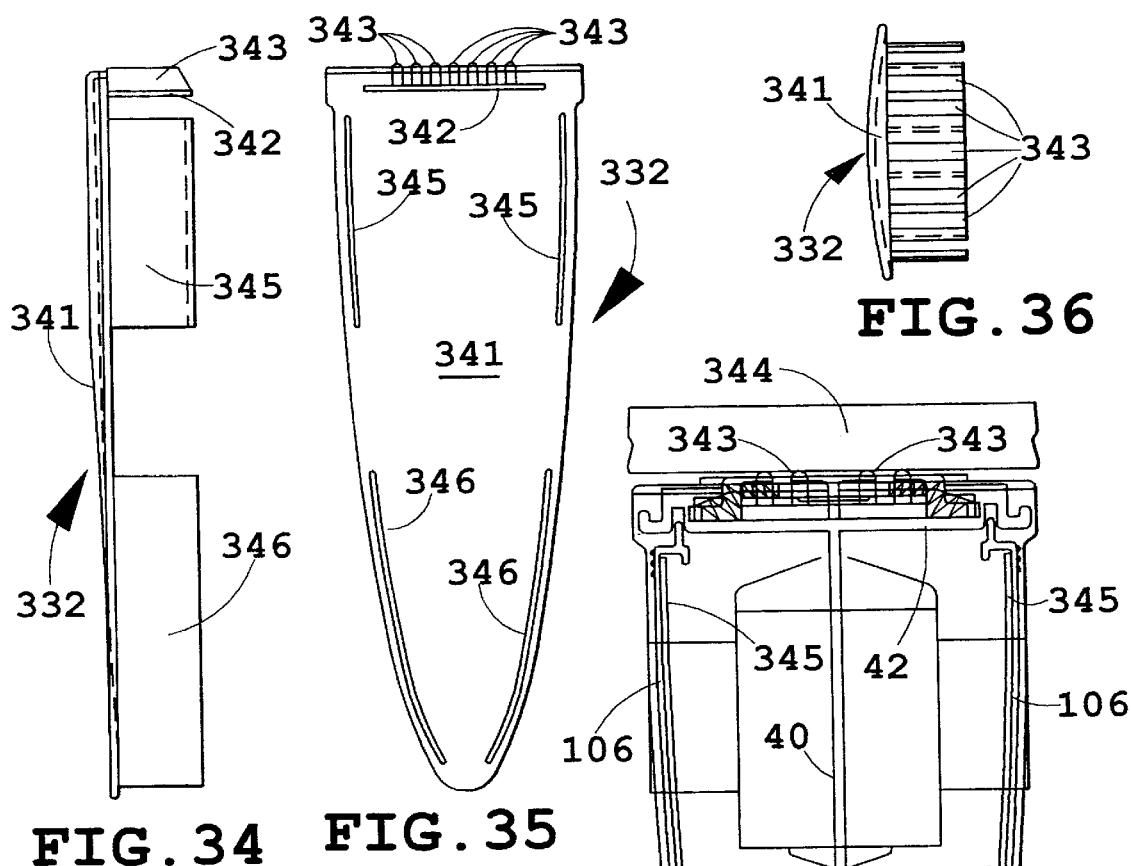
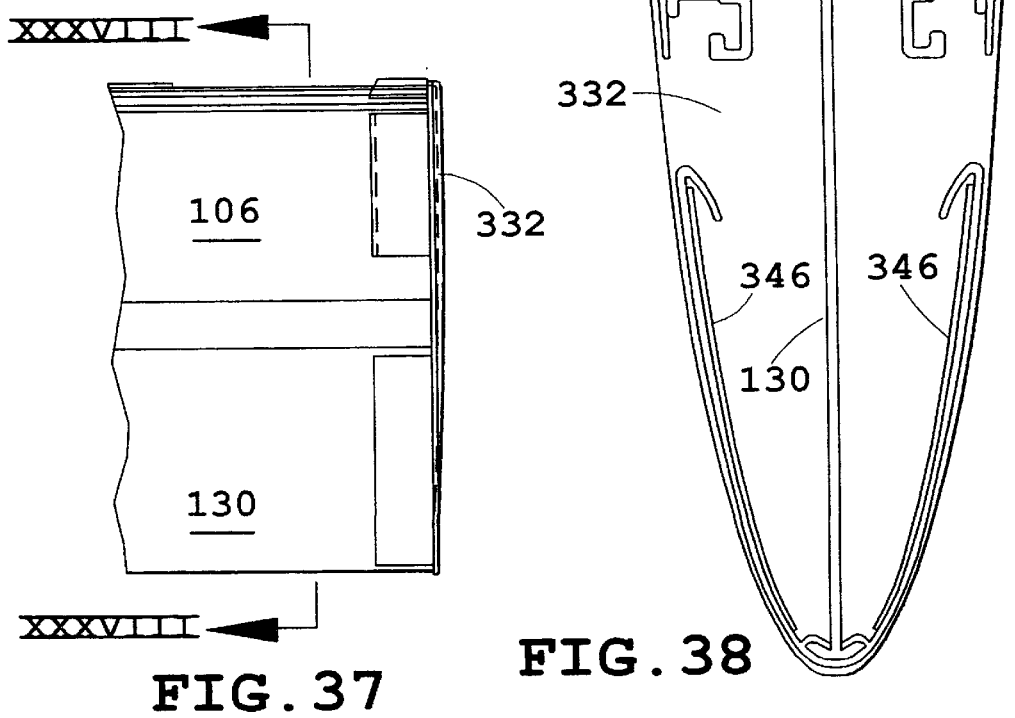
FIG. 34  FIG. 35  FIG. 36
FIG. 37  FIG. 38

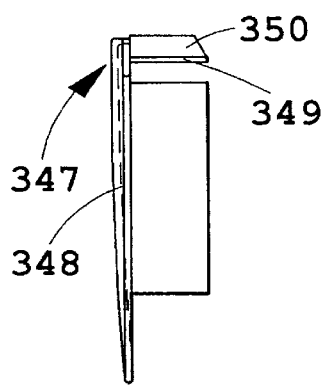
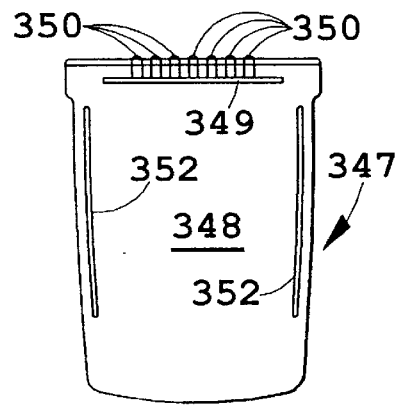
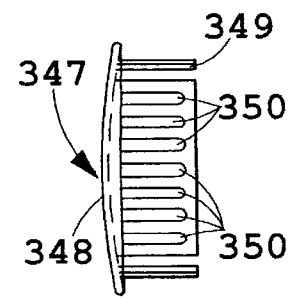
FIG. 39
FIG. 40
FIG. 41
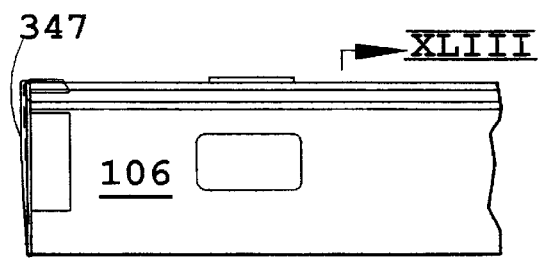
FIG. 42
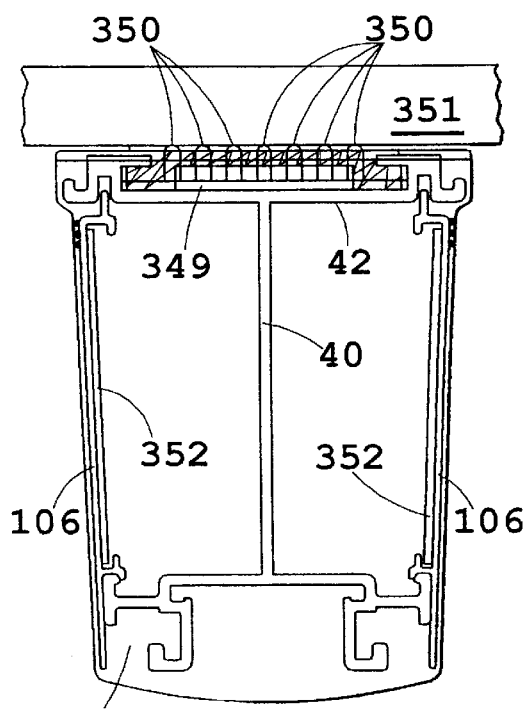
FIG. 43
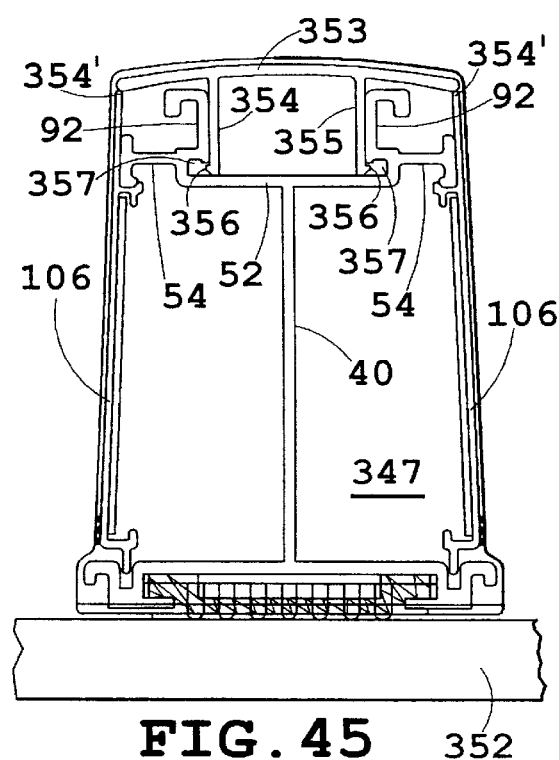
FIG. 45
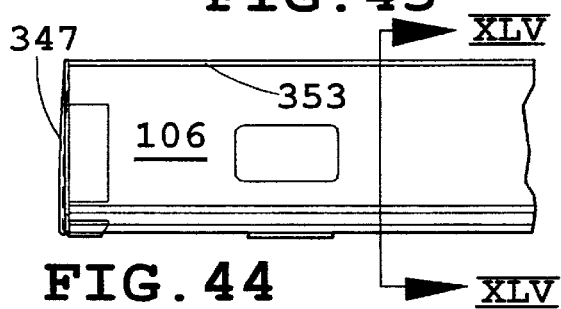
FIG. 44

MODULAR POWER AND CABLE DISTRIBUTION SYSTEM

CROSS-REFERENCE TO OTHER APPLICATION

This is a continuation-in-part application of U.S. patent application Ser. No. 08/649,212, filed May 17, 1996, titled TABLE WIRE TROUGH.

FIELD OF THE INVENTION

This invention relates to modular power and cable distribution systems for furniture, and more particularly to modular power and cable distribution systems which are adapted to be mounted to a worksurface for supporting and housing one or more electrical power receptacles and/or communication receptacles and associated wiring.

BACKGROUND OF THE INVENTION

It is known to provide furniture with raceways adapted to receive cables to allow routing of cables from a worksurface to a wall or floor outlet. It is also known to provide movable wall partitions with raceways adapted to receive electrical powerways. However, the known furniture raceways are generally integrally formed with the furniture, are generally not adapted for receiving an electrical powerway to provide convenient positioning of electrical outlets at desired locations on the furniture, and do not allow separate routing of power and communication cables to provide adequate isolation therebetween. Additionally, the known raceways do not generally allow reconfiguration as desired, and are not adapted to be easily mounted, demounted and remounted as desired to provide a powerway, a communication wireway, or both, as needed. Likewise, partition raceways are generally integrally formed with the partitions and do not generally allow separate routing of power and communication cables, nor do they allow reconfiguration as desired to provide a powerway, a communication wireway, or both, as desired.

There also remains a need for a modular power and cable distribution system which is adapted to be mounted to generally any connected or ganged worksurfaces to provide means for distributing power and communication cables along a series of connected worksurfaces. Further, there is a need for providing a modular power and cable distribution system which is adapted to distribute power and communication cables along a series of connected worksurfaces which includes means for concealing or covering gaps or joints between adjacent aligned powerways and/or cableways. There is also a need for providing modular power and cable distribution systems for distributing power and/or communication cables along a series of connected worksurfaces with aesthetically acceptable means for feeding cables into the power and cable distribution system, and for providing aesthetically acceptable means for capping the ends of the power and cable distribution system.

SUMMARY OF THE INVENTION

This invention pertains to a modular wireway adapted to be easily mounted, demounted and remounted as desired, and configured and reconfigured as desired to provide a powerway with electrical receptacles, a communication wireway, or both, as desired. The modular wireway or raceway can be easily mounted on generally any support surface, such as the worksurface of a desk or table, and can be easily and conveniently combined with various attachments such as modesty panels and auxiliary cableways or troughs. The various attachments can be easily mounted, demounted and remounted without tools and without fasteners, such as screws or bolts, to provide a level of flexibility and convenience which has not heretofore been provided. In certain configurations, the invention provides a combined electrical powerway and communication cable raceway, wherein voice and data communication cables can be properly isolated from the electrical powerway. The invention may also be used to provide electrical and voice/data connections between a series of linked tables, desks, or the like; whereby a plurality of linked furniture may be powered and/or voice/data wiring may be provided via a single power and/or voice/data feed. The invention also provides a convenient means for concealment of excess appliance cord, communication cord, computer cables, and the like.

Also provided are means for aligning powerways and/or cableways on adjoining or ganged worksurfaces, means for concealing or covering gaps or joints between adjacent aligned powerways and/or cableways, aesthetically acceptable means for feeding cables into the powerways and/or cableways, and aesthetically acceptable means for capping the ends of powerways and/or cableways.

In accordance with one aspect of the invention, a modular power and cable distribution system includes an elongate member having a top flange which is configured to be mounted to a worksurface, a vertical web extending downwardly from the top flange, and a bottom flange, the bottom flange including a connector which is configured to detachably support at least one of a trough mounted laterally adjacent to the elongate member, a closure panel which together with the elongate member defines an enclosed powerway, and a modesty panel depending from the elongate member.

In accordance with another aspect of the invention, a modular power and cable distribution system includes at least two longitudinally aligned elongate members, each of which includes a top flange which is configured to be mounted to a worksurface, a vertical web extending downwardly from the top flange, and a bottom flange, the elongate member defining structure for distributing power and communication cables. At least one of the flanges of the elongate member defines opposing, longitudinally extending spaced apart channels. An alignment member having opposite side edges is received within the spaced apart channels of each of the elongate members when the spaced apart channels of one of the members is aligned with those of an adjacent member. The alignment member facilitates and maintains proper alignment of the elongate members.

A still further aspect of the invention relates to a modular power and cable distribution system which includes first and second longitudinally aligned elongate members, each having a top flange which is configured to be mounted to a worksurface, a vertical web extending downwardly from the top flange, and a bottom flange; a modesty panel dependently supported from each of the longitudinally aligned elongate members, the modesty panels being longitudinally aligned and spaced apart from each other to form a cable infeed gap; and an infeed trim piece attached to the top flange of the elongate member, the infeed trim piece being configured to cover the infeed gap between the spaced apart modesty panels.

BRIEF DESCRIPTION OF THE DRAWINGS

FIG. 2 is a perspective view of the modular wireway shown in FIG. 1, with the hinged trough rotated to the open position;

FIG. 3 is a transverse cross-sectional view of a modular wireway in accordance with the invention, configured for use with pop-up grommets;

FIG. 5 is a transverse cross-sectional view of a modular wireway having an attached auxiliary cable management trough and a modesty panel;

FIG. 7 is a transverse cross-sectional view of a modular wireway in accordance with the invention, including a first cable management trough laterally disposed on one side of the elongate member which is utilized in connection with a standard grommet, and a second auxiliary cable management trough laterally disposed on the opposite side of the wireway and utilized in association with a pop-up grommet;

FIG. 8 is a transverse cross-sectional view of a modular wireway in accordance with the invention, having an attached cable management trough extending outwardly beyond the underside of a worksurface to which the wireway is mounted;

FIG. 10 is an enlarged, detailed cross-sectional view of a modular wireway having a rigidly attached cable management trough laterally disposed on one side thereof;

FIG. 12 is an enlarged, detailed transverse cross-sectional view of a modular wireway which is similar to that shown in FIG. 11, but which includes an alternative modesty panel which includes a raceway having a bottom and side walls, with the upper ends of the side walls being vertically spaced from the removable panels of the wireway so that cables can be layed into the raceway;

FIG. 15 is a perspective view of an alignment member used to facilitate and maintain proper alignment of elongate members mounted on adjoining worksurfaces;

FIG. 16 is a fragmentary top plan view of two longitudinally aligned elongate members which are guided and maintained in proper alignment by an alignment member;

FIG. 17 is a side elevational view in partial cross-section as viewed along lines XVII—XVII of FIG. 16;

FIG. 18 is a horizontal sectional view along lines XVIII—XVIII of FIG. 16;

FIG. 19 is a fragmentary side elevational view of a gap filler trim piece configured to cover gap between adjacent ends of longitudinally aligned troughs which are mounted laterally adjacent to each of two longitudinally aligned elongate members;

FIG. 20 is a transverse cross sectional view along lines XX—XX of FIG. 19;

FIG. 22 is a transverse cross sectional view along lines XXII—XXII of FIG. 21;

FIG. 24 is a transverse cross sectional view along lines XXIV—XXIV of FIG. 23;

FIG. 27 is a longitudinal cross sectional view along lines XXVII—XXVII of FIG. 26;

FIG. 28 is a fragmentary side elevation view of an infeed trim piece configured to cover an infeed gap formed between the end of a modesty panel and the end of an elongate member from which the modesty panel is supported;

FIG. 29 is a side elevational view of an end cap for a elongate member and a trough mounted laterally adjacent to the elongate member;

FIG. 30 is a rear elevational view of the end cap of FIG. 29;

FIG. 31 is a top plan view of the end cap of FIG. 29;

FIG. 32 is a fragmentary side elevational view of the end cap shown in FIGS. 29–31 installed at the end of a powerway/cableway comprising a trough mounted laterally adjacent to an elongate member;

FIG. 33 is a transverse cross sectional view along lines XXXIII—XXXIII of FIG. 32;

FIG. 34 is a side elevational view of an end cap configured for capping the end of a powerway/cableway including a modesty panel dependently supported from an elongate member;

FIG. 35 is a rear elevational view of the end cap of FIG. 34;

FIG. 36 is a top plan view of the end cap of FIG. 34;

FIG. 37 is a fragmentary side elevational view of the end cap shown in FIGS. 34–36 installed at the end of a powerway/cableway including a modesty panel dependently supported from an elongate member;

FIG. 38 is a transverse cross sectional view along lines XXXVIII—XXXVIII of FIG. 37;

FIG. 39 is a side elevational view of an end cap configured for covering the end of a powerway/cableway comprising an elongate member and closure panels supported on each side of the elongate member;

FIG. 40 is a rear elevational view of the end cap FIG. 39;

FIG. 41 is a top plan view of the end cap FIG. 39;

FIG. 42 is a fragmentary side elevational view of the end cap shown in FIGS. 39–41 installed at the end of a powerway/cableway comprising panels supported on each side of the elongate member;

FIG. 43 is a transverse cross sectional view along lines XLIII—XLIII of FIG. 42;

FIG. 44 is a fragmentary side elevational view of a powerway/cableway mounted on the top side of a worksurface and having an end cap configured to cover the end of the powerway/cableway and a top cap configured to cover the top of the powerway/cableway; and FIG. 45 is a transverse cross sectional view along lines XLV—XLV of FIG. 44.

DESCRIPTION OF THE PREFERRED EMBODIMENTS

Figure 1:
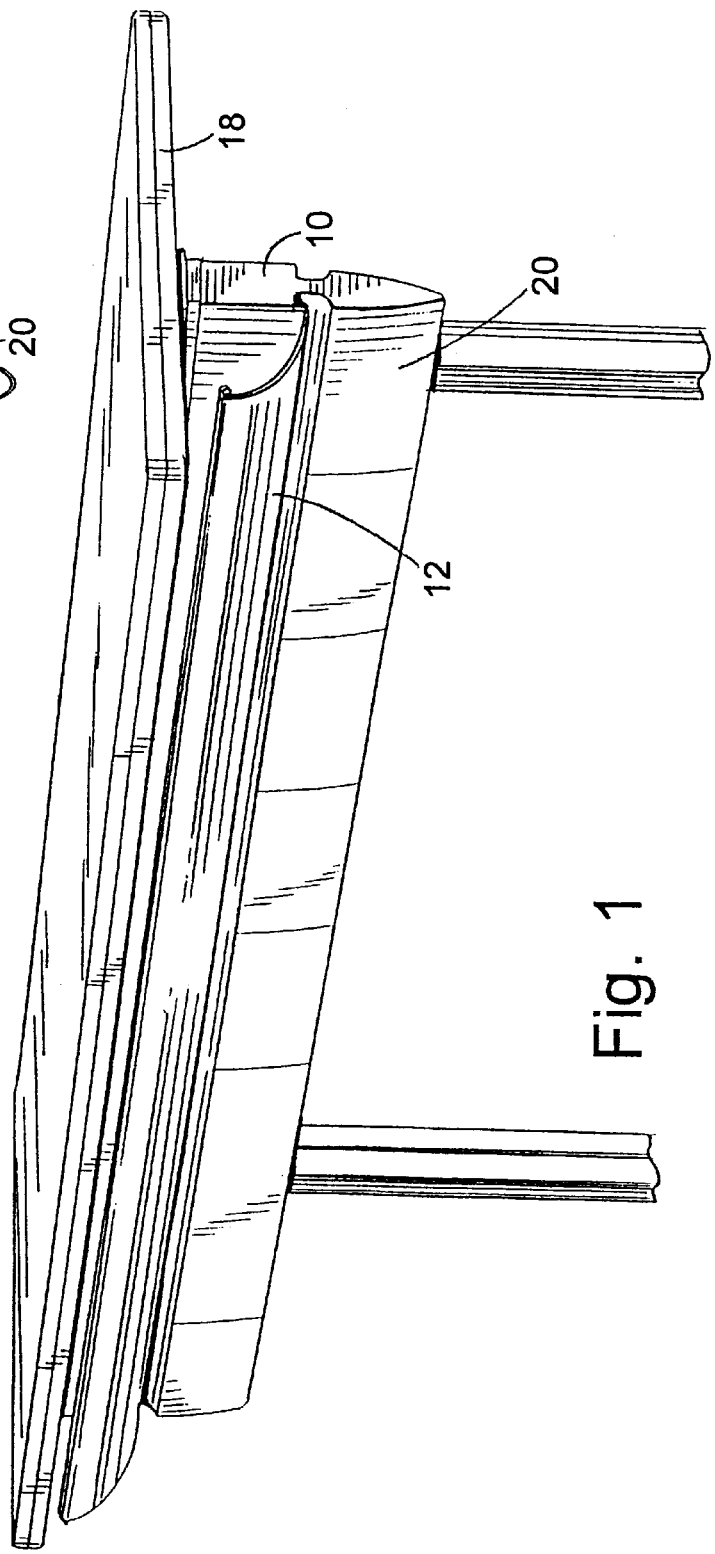
FIG. 1 is a perspective view of a modular wireway mounted to the underside of the worksurface of a table and including an auxiliary cable management trough hingedly connected to a powerway and a dependent modesty panel connected to the powerway.

In FIG. 1, there is shown a first embodiment of the raceway 10 and cable management trough 12 of this invention, with the cable management trough 12 in the raised or closed position to conceal wires, cables, receptacles, etc. FIG. 2 shows the raceway 10 and cable management trough 12 of FIG. 1 with the cable management trough in the lowered or open position to provide access to communication receptacles 14 such as telephone or computer network ports, or the like and/or electrical receptacles 16. The raceway 10 is adapted to be mounted to a variety of support surfaces 18, and is especially intended to be mounted to the underside or top of worksurfaces of furniture, such as desks, tables, counters and the like. The raceway 10 is also specially configured to be used with a variety of different attachments, including cable management troughs 12, which can be either fixed or detachably and hingedly connected to the raceway 10, modesty panels 20, and combinations thereof. The ability of the raceway 10 to be combined with various attachments provides exceptional flexibility and convenience in its application.

The raceway 10 can, for example, be used by itself, without attachments (i.e. without auxiliary cable management troughs, wireways, modesty panels, etc.) to provide data ports, electrical outlets or the like adjacent to the underside of a support surface, such as a worksurface of a conference table. Cables, wires or the like may be run from equipment positioned on top of the worksurface to the receptacles on the raceway 10, such as by draping the wire over the edge of the worksurface and running it to the raceway along the underside of the worksurface, or the wires can be run through an opening or grommet in the worksurface, such as through a pop-up grommet as shown in FIG. 3.

Figure 4:
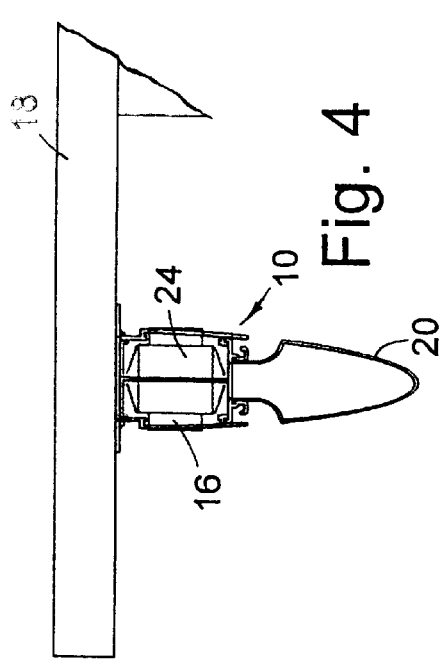
FIG. 4 is a transverse cross-sectional view of a modular wireway in accordance with the invention, having a modesty panel attached thereto.

As another example, the raceway 10 can be used with an attachable modesty panel 20 as shown in FIG. 4.

Figure 6:
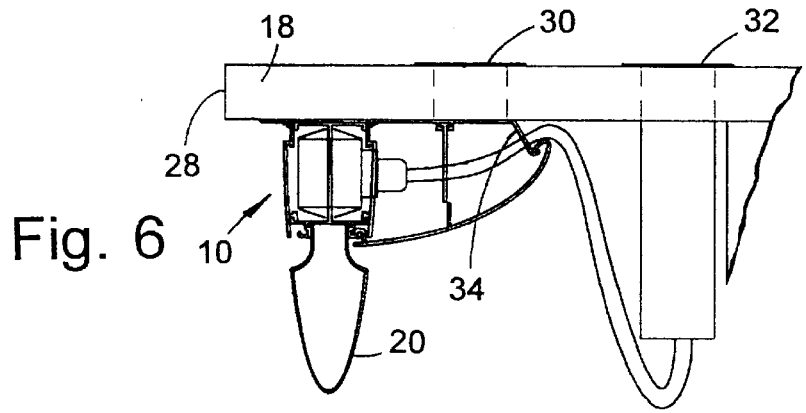
FIG. 6 is a transverse cross-sectional view of a modular wireway in accordance with the invention, including an attached auxiliary cable management trough used in association with a standard grommet and a pop-up grommet.

As another alternative, the raceway 10 can be used with a single attachable cable management trough 12, such as shown in FIGS. 5 and 6, or with two cable management troughs, one attached to each side of the raceway 10, such as shown in FIG. 7. FIG. 5 shows a raceway 10 having a single cable management trough 12, attached thereto a modesty panel 20, and containing one or more power distribution modules 24 having one or more electrical and/or communication receptacles. A flexible conduit 26 through which power and/or communication cables can be run from the floor to the raceway, as shown in FIG. 5. Power and/or communication distribution cables can be supplied to any of the modules 24 shown in the other figures, such as through an aperture in the raceway 10 or, for example, from a wall to the raceways. The arrangement shown in FIG. 5 allows wires to be passed from the upper side of the worksurface 18, around an edge thereof, and downwardly into the cable management trough 12, and to a receptacle 16 on power module 24. FIG. 6 shows an arrangement similar to that of FIG. 5, but with the cable management trough 12 attached to a side of the raceway 10 opposite the side closest to the edge 28 of the worksurface 18. This arrangement can be used, for example, to pass one or more communication and/or power cables from the upper side of the worksurface, through a grommet 30, and to a receptacle on module 24, or, for example, through a pop-up grommet 32, and into trough 12 through a gap between the edge of trough 12 and the underside of the worksurface. FIG. 7 shows an arrangement including raceway 10 and two troughs 12, attached to opposite sides of raceway 10. This arrangement can be used, for example, to pass cables from the upper side of the worksurface through a standard grommet 30, through trough 12, and to a receptacle on module 24; or through pop-up grommet 32, through a gap between the edge of trough 12 and the underside of the worksurface. Obviously, the arrangement shown in FIGS. 3, 6 and 7 can be used with any number of standard grommets 30 and/or any number of pop-up grommets 32. Troughs 12, in any of the illustrated arrangements, can be used for conveniently laying any excess length of cable therein, to minimize the amount of exposed cable above the worksurface, and to eliminate cable from dangling beneath the worksurface, or to minimize the amount of cable which dangles beneath the worksurface.

FIG. 8 shows another alternative arrangement wherein removable cover plates can be eliminated from the raceway to provide an elongate, generally I-beam shaped member 40 to which a power module 24 and trough 12 are attached. This arrangement allows cables to be draped over an edge of a worksurface and dropped down into trough 12 and run to a receptacle 16. This arrangement may be conveniently used at the rear edge of a table, desk or the like, which is adjacent a wall or partition.

Figure 9:
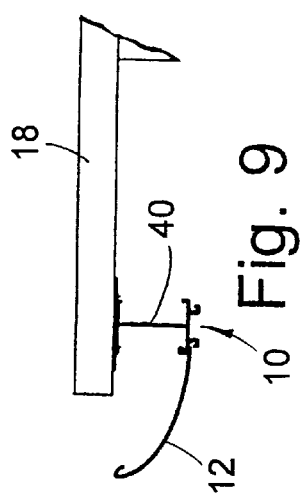
FIG. 9 is a transverse cross-sectional view of a modular wireway similar to that shown in FIG. 8, but which is utilized without power modules or power receptacles.

FIG. 9 illustrates an arrangement which is similar to that shown in FIG. 8, but without any power modules, demonstrating the utility of the invention as a wire chase for conveniently running communication cables and/or stowing excess lengths of cables even when the raceway I-beam shaped member 40 is not used as a powerway.

The powerway of this invention is shown in greater detail in FIG. 10. Powerway 10 is comprised of an elongate, generally I-beam shaped member 40, shown in transverse cross-section in FIG. 10. Elongate member 40 includes an upper mounting flange 42 for attaching member 40 to a support surface. With the illustrated embodiment, elongate member 40 is mounted to the underside of a worksurface by means of brackets 44 and separate, generally T-shaped rails 45. Brackets 44 and rails 45 are held to the underside of worksurface 18 by threaded fasteners. Brackets 44 are preferably secured to the worksurface by a combination of adhesives and the threaded fasteners. Brackets 44 act as reinforcement for the worksurface to prevent the rails from possibly being torn away from the worksurface. There are preferably shouldered slots on the rails 45 which allow the position of the rails to be shifted to allow alignment with adjacent powerways on adjoining worksurfaces. Mounting flange 42 includes a T-shaped channel defined by a horizontal surface 47 of flange 42, first and second upright extensions 46 at opposite sides of flange 42, and horizontal extensions 48 which extend toward each other from upright extensions 46. Bracket 44 can be attached to a worksurface using a variety of fasteners, such as adhesives, screws, etc. Elongate member 40 is easily mounted on rail 45 by merely aligning the T-shaped channel of flange 42 with the T-shaped rail 45 and sliding member 40 onto rail 45. Instead of using an elongate bracket 44, it is also possible to support member 40 in a similar manner using a plurality of short brackets having the same or similar cross-sectional shape as bracket 44. For example, member 40 may be supported using two such brackets, such as one at or near opposing ends of member 40. A variety of alternative techniques or variations of the illustrated means may also be employed to attach member 40 to a support surface. Means which allow member 40 to be easily attached to and removed from the worksurface are preferred. Bracket 44 is preferably made of a relatively strong, durable and rigid material, such as steel. Elongate member 40 can be formed of a variety of different materials, although strong, durable, rigid materials which can be extruded, such as aluminum, or pultruded, such as fiber reinforced resins, are preferred.

Elongate member 40 also includes a vertical web 50 which depends from horizontal mounting flange 42, and a lower attachment support flange 52 connected to the lower end of web 50. Attachment support flange 52 includes connectors 54 for attaching a stationary, or rigidly connected cable management trough 12 or cover door to elongate member 40. Trough 12 is an elongate shelf-like member having a trough-defining wall 56 which curves outwardly away from flange 52 and upwardly toward a horizontal plane, and preferably terminates at a horizontal plane below the upper side of the worksurface, and more preferably terminates at a horizontal plane about even in elevation with the underside of the worksurface, i.e. about even with flange 42. Along the lower edge of trough 12 is a mating connector 58 which is adapted to clip on to, snap on to, or otherwise reversibly connect trough 12 to member 40 by means of mating engagement with connector 54, preferably without requiring any tools or auxiliary fasteners such as screws, bolts, etc. In the illustrated embodiment, connectors 54 are comprised of connector rails 60 having an upper supporting edge 62; an upper, vertical abutment wall surface 64 facing toward web 50; a vertical abutment wall surface 66 facing away from web 50; and a lower edge 68. Connector rails 60 are supported by horizontal webs 70 which generally extend away from opposite sides of attachment support flange 52 to a portion of each of the rails 60 which is between the upper and lower edges 62, 68, respectively.

The mating connector 58 on trough 12 is comprised of an inverted J-shaped hook 72 which hooks onto rail 60. Specifically, the downwardly extending end 74 of hook 72 engages abutment wall surface 64 and upwardly projecting segment 76 engages abutment wall surface 66 to prevent rotation of trough 12 about connector 54; and trough 12 is supported by the upper edge 62 of rail 60 upon which hook 72 bears. In order to enhance the rigidity of the connection, and to facilitate snap-type or snap-on attachment between trough 12 and member 40, trough 12 includes an extension 78 which engages the lower edge 68 of connector 54, and an upwardly projecting tab 80 which engages a lower vertical wall 82 of connector rail 60 facing toward web 70. The upper edge of upper vertical abutment wall 64 includes a longitudinal protuberance 84 which helps ensure a tight snap-connection between connector 54 and mating connector 58.

Along the upper edge of trough 12 is a horizontal flange 86 which extends toward web 50 and a diagonally oriented flange 88 which extends from the underside of flange 86 downwardly and toward web 50. Flanges 86 and 88 help conceal communications cables 90 from view and provide a surface for mounting a latch or fastener.

Figure 11:
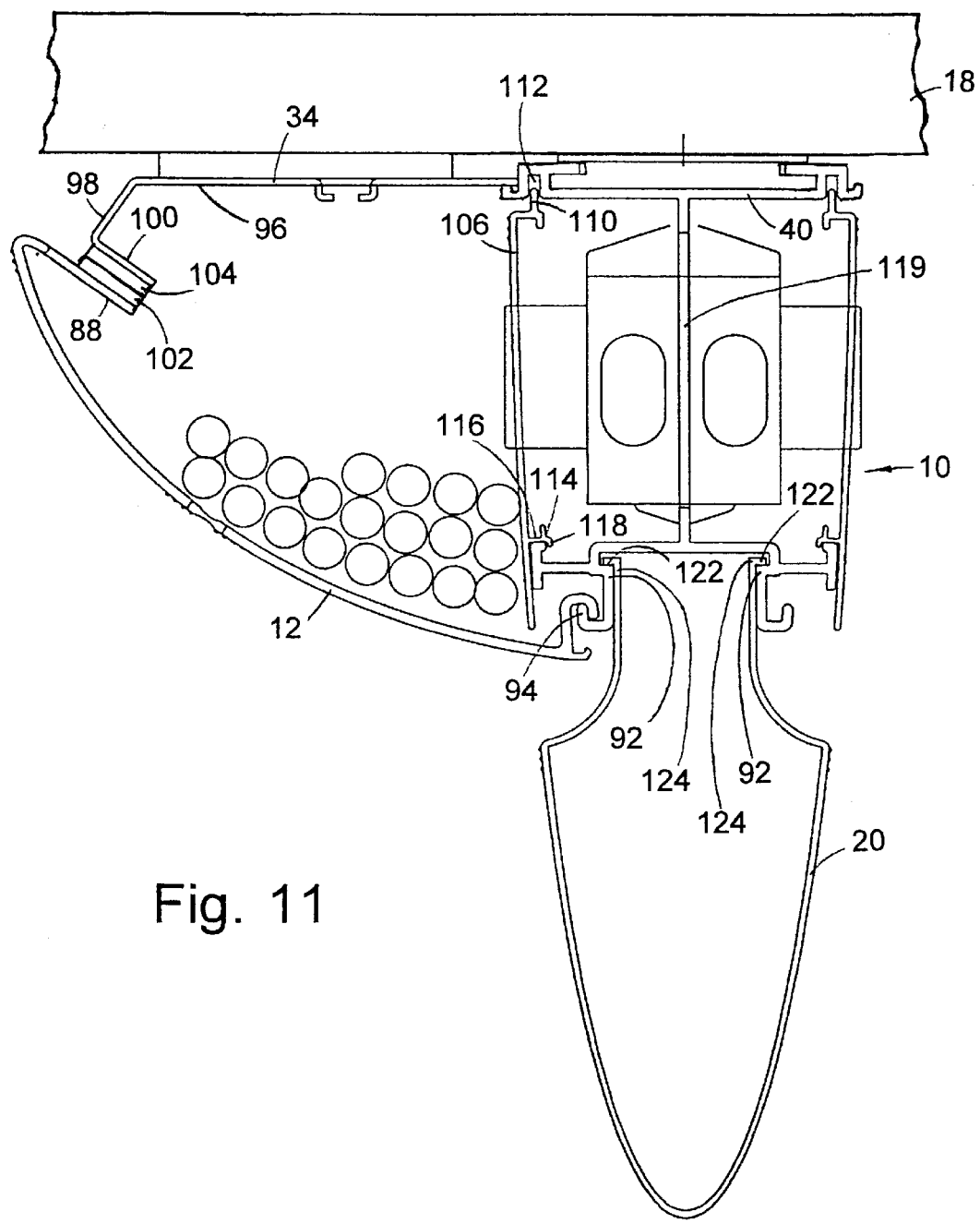
FIG. 11 is an enlarged, detailed transverse cross-sectional view of a modular wireway in accordance with the invention, having attached thereto a hinged cable management trough, a modesty panel, and removable panels which define an enclosed powerway.

With reference to FIG. 11, there is shown a raceway 10 and a cable management trough 12 which is hingedly connected to connector 92 of elongate member 40. Connectors 92 are J-shaped hook connectors which extend downwardly from each side of attachment support flange 52 and which are substantially identical in size and shape to inverted J-shaped hooks 72. Inverted J-shaped hook 72 of trough 12 is merely hooked to J-shaped hook 92 as shown in FIG. 11. The spacing between the opposing vertical wall sections of J-shaped hook 92 is greater than the wall thickness of the downwardly extending end 74 of hook 72, and the spacing between the opposing vertical wall sections of inverted J-shaped hook 72 is greater than the wall thickness of upwardly extending end 94 of hook 92 so that hook 72, and hence trough 12, can be rotated relative to hook 92. However, the spacing between the opposing, vertical walls of J-shaped hook 92 and inverted J-shaped hook 72 is sufficiently small to limit rotation of trough 12 to about 30 degrees so that when trough 12 is swung open, cables 90 do not fall out of the trough. A bracket 34 mounted to the underside of support surface 18 is used to hold trough 12 in the raised or closed position shown in FIG. 11. Bracket 34 includes a horizontal section 96 which is attached to support surface 18, a section 98 which slopes downwardly and away from raceway 10 toward the upper end of trough 12, and a section 100 which slopes downwardly and back toward raceway 10. Section 100 is generally parallel with and generally in abutment with flange 88 of trough 12 when trough 12 is in the raised or closed position. Flange 88 and section 100 of bracket 34 are provided with cooperating fastening elements 102, 104 which allow trough 12 to be reversibly retained in the closed position. A preferred fastening means 102, 104 is a hook and loop type fastener (e.g., VELCRO® type fastener). For example, fastener element 102 secured to trough 12 can have a surface facing element 104 which includes a multiplicity of filament loops, and element 104 secured to bracket 34 can have a multiplicity of miniature hooks which hook onto the loops on element 102. Various other retention or reversible fastening means can be employed, such as magnets, snap fasteners, etc.

As shown in FIG. 1, raceway 10 is provided with removable closures panels 106 on each side thereof to define an enclosed powerway. Panels 106 can be removably supported on member 40 using any of various retainers or connectors such as hooks, magnets, loop and hook fasteners, etc. In the illustrated embodiment, panel 106 is provided with an upwardly projecting tongue 110 which fits into a groove 112 on upper mounting flange 42 of member 40, and a hook 114 configured to engage connector 54 of attachment support flange 52. Specifically, hook 114 includes a generally horizontal segment 116 which rests upon upper edge 62 of rail 60 and a downwardly extending segment 118 which engages protuberance 84 on the upper edge of upper vertical wall 64. Panels 106 can be supported on member 40, without tools or auxiliary fasteners, by inserting tongue 110 into groove 112, urging the lower end of panel 116 toward connector 54 and allowing hook 114 to snap into place or otherwise engage connector 54, such as by lowering hook 114 over connector 54. Panel 106 can be removed by urging the lower end of panel 106 upwardly and outwardly (i.e. away from web 50), or more preferably by merely pulling the lower end of panel 106 outwardly, and then allowing tongue 110 to slide downwardly from groove 112.

Trough 12 and panels 106 can be made of any suitable material. However, trough 12 and panels 106 are preferably extruded (or possibly pultruded) thermoplastic parts which are strong, durable and lightweight. Panels 106 preferably exhibit sufficient flexibility and resilience to facilitate snap engagement between hook 114 and connector 54. Likewise, trough 12 preferably exhibits sufficient flexibility and resilience to permit snap type engagement between connector 54 and mating connector 58. The various connectors 54, 58, hooks 92, 114, fastening elements 102, 104, tongue 110, groove 112, etc., typically extend along the entire length of the components to which they are integral portions thereof, because they are preferably extruded or pultruded. However, the various components (e.g. member 40, trough 12, panels 106, bracket 34, etc.) can be provided with connectors, hooks, fastening elements, etc. which do not necessarily extend along the entire length of the component. For example, it may be possible to adequately retain trough 12 in the closed position (as shown in FIG. 11) using a plurality of fastener elements 102, 104 which are spaced apart along the length direction of trough 12 and bracket 34.

Bracket 34 can be made of any suitable material, such as steel, aluminum or plastic. Bracket 34 can be attached to support surface 18 using any suitable means such as adhesives, screws, etc.

The web portion 50 of I-beam shaped member 40 is provided with a plurality of uniformly spaced apart apertures 119 (e.g. spaced apart every 12 inches) which are sized and shaped to receive a commercially available power module 24 which can be snapped into place as shown in FIG. 11. The power modules include connector cables with quick connect couplings (not shown) that allow each power module to be connected in series with adjacent power modules and/or a power source. The connector cables can be of various lengths as desired so that any number of modules 24 can be used and spaced apart as desired. Modules 24 include means for connecting receptacles 16 to either or both sides of the raceway 10. The receptacles can include a single or double outlet as desired. Panels 106 are preferably provided with a plurality of knockout panels 120 which can be removed to allow receptacles 16 to pass through the resulting apertures. The knockout panels 120 are preferably provided along the length of panels 106 and are uniformly spaced apart to conform to the spacings between apertures 119.

As shown in FIG. 11, attachment support flange 52 and J-shaped hooks 92 define a connector having a T-shaped channel with support ledges 122 which support modesty panel 20. Specifically, modesty panel 20 includes a mating connector comprised of horizontal support flanges 124 which rest upon ledges 122. Modesty panel 20 can be installed by either aligning flanges 124 with the grooves above ledges 122 which are defined by the T-shaped channel, and sliding panel 20 onto member 40; or by urging flanges 124 toward each other and pushing the upper end of panel 20 into the channel and releasing the force urging flanges 124 together, so that flanges 124 spring outwardly and snap into the grooves above ledges 122. Various alternative connecting means can be provided if desired, although quick connectors which do not require tools or additional fasteners, such as screws, bolts, etc., are preferred. Modesty panel 20 can be made of a variety of suitable materials. However, inexpensive, lightweight, extrudable thermoplastic materials are preferred.

There is shown in FIG. 12, an arrangement generally comprising elongate member 40, panels 106, trough 12, bracket 34, bracket 44, module 24, receptacles 16, and an alternative modesty panel 130 which serves an addition function as a cable raceway. Modesty panel 130 includes a connector flange 132 adapted to connect with the modesty panel support connector on flange 52 of member 40 and a web 134 connecting flange 132 to raceway 136. Raceway 136 is an elongated member having a generally V-shaped or U-shaped cross-section defining a bottom and side walls, with the upper ends of the side walls being vertically spaced away from the elongate member 40, generally defined by member 40, so that cables can be layed into raceway 136.

Figure 13:
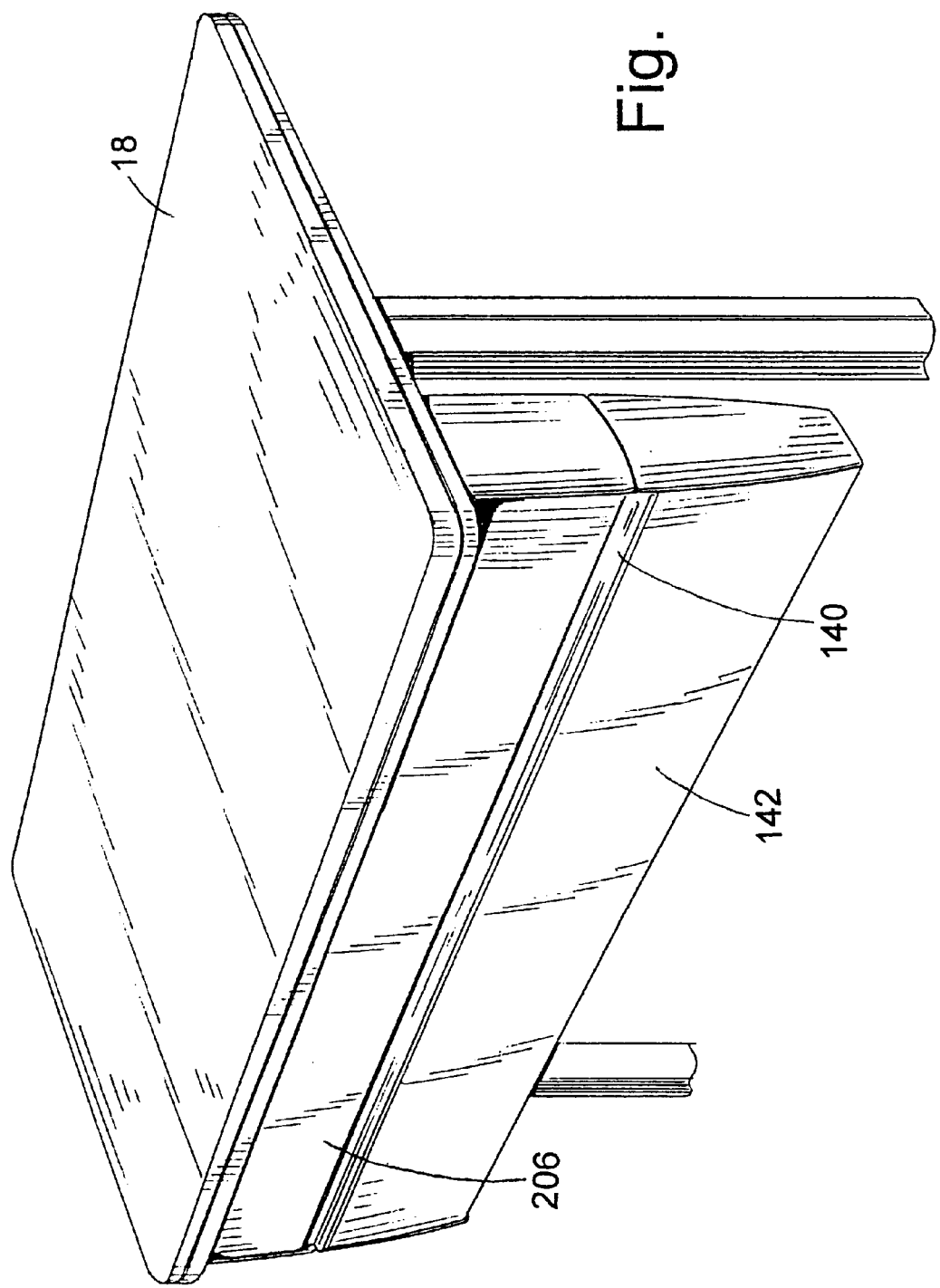
FIG. 13 is a perspective view of an alternative embodiment of the modular wireway and a dependently mounted modesty panel which also acts as an auxiliary raceway.
Figure 14:
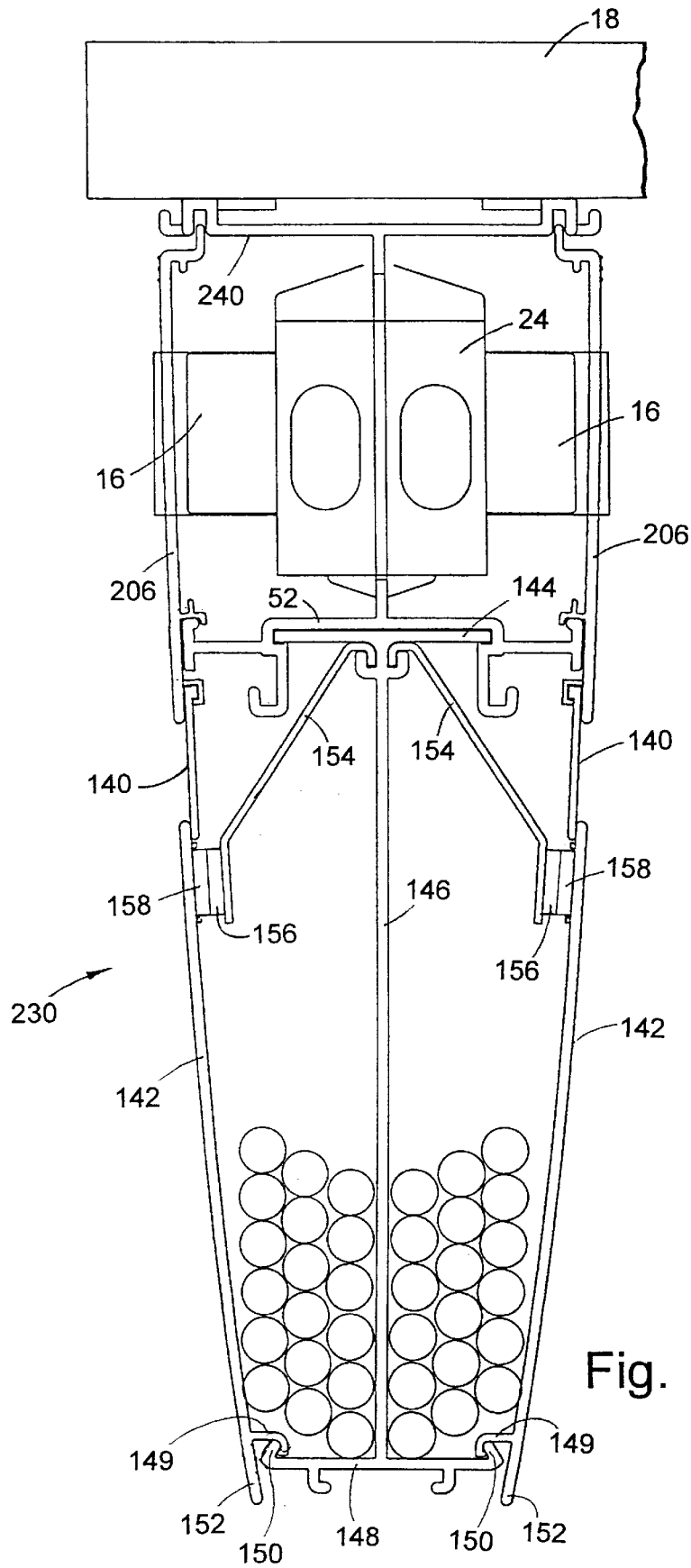
FIG. 14 is a detailed transverse cross-sectional view of the wireway and modesty panel shown in FIG. 13.

FIGS. 13 and 14 show an alternative embodiment of the invention generally comprising an elongate member 240, panels 206, bracket 44, module 24, receptacles 16, and another alternative modesty panel 230 which also functions as a cable raceway. Member 240 is generally similar to member 40, and panels 206 are generally similar to panels 106, except they include a cable access flap 140. Modesty panel 230 is generally similar to modesty panel 130, but differs in one major respect. Namely, modesty panel 230 is provided with access doors 142. Specifically, modesty panel 230 includes a connector flange 144 adapted to connect with the modesty panel support connector on flange 52 of member 240, a web 146 which depends from flange 144, and a lower door mounting flange 148 on which doors 142 are hingedly supported. Flange 148 includes hinge connectors 150 which extend diagonally upwardly and inwardly (toward web 146) from opposite ends of flange 144. Access doors 142 each include an inwardly directed connector or hook 149 near the lower end of the door which engages connectors 150 to detachably and hingedly support doors 142 on flange 144, without the use of tools or auxiliary fasteners. The lower end 152 of doors 142 extend below hooks 149 and engage the corners at the intersection of flange 148 and connectors 150, which act as stops to limit rotation of doors 142 about the hinge formed by connectors 150 and hooks 149 lo about 45 degrees. Modesty panel 230 also includes door retension brackets 154 which are connected at one end to web 146 and include a retainer element 156 at the other end which engages a retainer element 158 on access door 142 to retain door 142 in the raised or closed position shown in FIGS. 13 and 14. Retainer elements 156 and 158 can, for example, be loop and hook type elements (e.g. VELCRO® type fastener), snap fasteners, or one of the elements could be a magnet and the other a ferromagnetic material. Retension brackets 154 may extend along the entire length of panel 230 or a plurality of brackets 154 which are spaced apart along the length of panel 230 may also be used. Cable access flap 140 is preferably a flexible flap mounted to the lower end of panel 206. Flaps 140 provide a continuous closure between panels 206 and access doors 142 to conceal brackets 154 and the interior of modesty panel 230.

While I-beam shaped member 40 is primarily intended for use on the underside of a worksurface, member 40 can be mounted to a variety of support surfaces in generally any orientation. For example, member 40 can be mounted to the upper side of a worksurface to provide a table top or desk top powerway.

The I-beam member 40, power modules 24, receptacles 16, removable panels 106 or 206, troughs 12, and modesty panels 20, 130 or 230 may be easily installed to a worksurface at a furniture manufacturing facility, at a distributor or retail establishment, or at the point of use, and can be easily installed either on new furniture or retrofitted to generally any existing support surface. The I-beam member 40, power modules 24, receptacles 16, removable panels 106 or 206, trough 12 and modesty panels 20, 130 or 230 can be utilized, as desired, in a multiplicity of different configurations. For example, member 40 can be used with none, one or two troughs 12, either with or without a modesty panel 20, 130 or 230, with none, one or two removable panels 106 or 206, and with or without one or more power modules 24 and receptacles 16.

I-beam shaped member 40 and the various attachments 16, 24, 106 or 206, 12, 20, 130 or 230 can be easily mounted, demounted and remounted, as desired, without tools or additional fastening elements such as screws or bolts. Use of member 40 and panels 106 or 206 in combination with troughs 12, modesty panel 130 or 230, or both troughs 12 and modesty panel 130 or 230 provides separate routing cavities for power systems and voice/data cabling. In configurations utilizing modesty panels 130 or 230 which include internal wireways, at least 5 inches of separation can be provided between the powerway (modules 24 installed on member 40) and communication cables (voice or data) disposed in panels 130 or 230, with a metal barrier (flange 52) disposed between the powerway and the communication cables, whereby compliance with Electronics Industry Association (EIA) standards and Telecommunication Industry Association (TIA) standards relating to isolation of communication cables from powerways may be achieved.

In FIGS. 15, 16 and 17 there is shown an alignment member 300 used for facilitating and maintaining proper alignment of adjoining elongate member 40. The alignment member 300 is divided into two longitudinally adjacent sections 301 and 302 by transverse abutment walls 303. The alignment member 300 includes opposite side flanges 304 which are configured to be received within opposing, longitudinally extending spaced apart channels (FIG. 18) defined by flange 42, upright extensions 46 and horizontal extensions 48. Alternatively, it is conceivable that the alignment member 300 could be received in opposing, longitudinally extending spaced apart channels defined by bottom flange 52. Section 301 of alignment member 300 includes portions 305, 306 and 307 which provide a vertical thickness which is greater than that of the longitudinally adjacent section 302. The greater thickness of section 301 provides surfaces which frictionally engage an adjacent worksurface 308 (FIGS. 17 and 18). The frictional engagement of thicker portions 305, 306 and 307 of section 301 of alignment member 300 causes section 301 to become tightly wedged between top flange 42 of elongate member 40 and worksurface 308 as compared with section 302 which does not encounter frictional resistance with the worksurface. By providing a relatively thick section 301 which frictionally engages the worksurface 308 causing the alignment member 300 to become wedged between the worksurface and the elongate member 40, it is possible to insert section 301 into an elongate member mounted on one worksurface, align flanges 304 of section 302 of alignment member 300 with a second elongate member mounted on a second worksurface, and bring the two worksurfaces together as flanges 304 of section 302 of alignment 300 are freely inserted into opposing, longitudinally extending spaced apart channels in the top flange of the elongate member mounted on the second worksurface. The relatively greater frictional forces between section 301 of alignment member 300 and the first elongate member, as compared with the frictional forces between section 302 of alignment member 300 and the second elongate member allow the flanges 304 of section 302 of alignment member 300 to be freely inserted into the spaced apart channels of the second elongate member as the worksurfaces and elongate members mounted thereto are drawn together, such that frictional forces between the section 302 of alignment member 300 and the second elongate member are sufficiently low to avoid undesirable longitudinal displacement of the first member as the worksurfaces are brought together. As shown in FIGS. 16 and 17, the brackets 44 and T-shaped rails 45, described with reference to FIGS. 1–15, can be comprised of relatively short, longitudinally spaced apart mounting blocks 309 having an overall transverse cross sectional shape similar to that of bracket 44 and T-shaped rail 45. In order to further enhance frictional engagement between section 301 of alignment member 300 and worksurface 308, portions 305, 306 and 307 include projecting ribs 311. The worksurfaces upon which the adjacently aligned powerways/cableways are mounted can be connected together in generally any suitable manner, such as latch type fasteners, etc.

In FIGS. 19 and 20, there is shown a gap filler trim piece 310 which is configured to cover a gap between adjacent ends of longitudinally aligned trough 12. The gap between longitudinally aligned trough 12 and/or elongate members 40 is at least equal to the thickness of walls 303 of alignment member 300, but can be greater, when the aligned troughs and/or elongate members are not in abutment with walls 303 of the alignment member. Gap filler trim piece 310 has a transverse profile as shown in FIG. 20 which is generally similar to the cross sectional shape of trough 12. Specifically, gap filler trim portion 310 includes a trough support portion 312 which extends downwardly and toward the elongate member at an angle from an upper portion of the trim piece 310. Trough support portion 312 rest upon flange 88 of trough 12. A C-shaped hook portion 314 projects upwardly from a lower portion of the gap filler trim piece 310 and into a recess or groove 315 defined by connector elements 316 and 317 of trough 12. Engagement between trough support portion 312 and flange 88, and engagement between hook portion 314 and recess 315 provide a snap together type engagement between the gap filler trim piece 310 and the trough 12. Gap filler trim portion 310 is installed by positioning trough support portion 312 over flange 88 of trough 12 and snapping hook portion 314 into recess 315.

Figure 21:
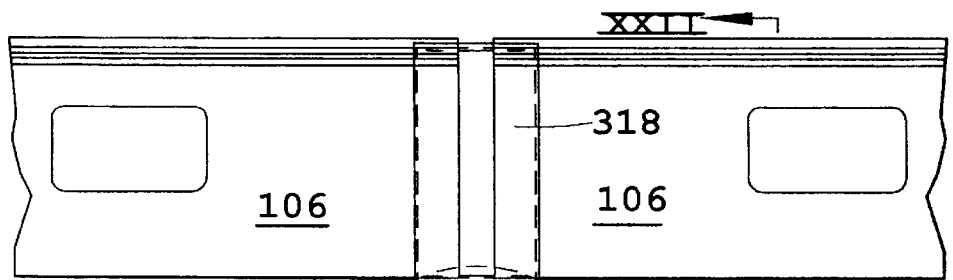
FIG. 21 is a fragmentary side elevational view of a gap filler trim piece which is configured to cover a gap between adjacent ends of longitudinally aligned closure panels supported by two longitudinally aligned elongate members.

In FIGS. 21 and 22, there is shown a gap filler trim piece 318 which is configured to cover a gap between adjacent ends of longitudinally aligned closure panels 106 supported on longitudinally aligned elongate members 40. Trim piece 318 is provide with a C-shaped hook portion 319 which extends from a upper portion of the trim piece into a recess 320 defined by connector element 321 of elongate member 40. A retainer hook portion 322 extends from the lower portion of trim piece 318 and includes an upwardly projecting tab 323 which provides a snap type engagement between the trim piece and the powerway defined by elongate member 40 and closure panels 106. Trim piece 318 is installed by inserting hook portion 319 into recess 320 and snapping tab 323 over the lower end of closure panel 106.

Figure 23:
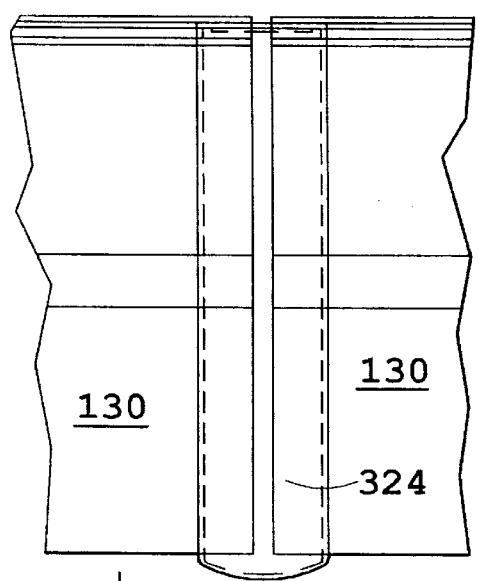
FIG. 23 is a fragmentary side elevational view of a gap filler trim piece configured to cover a gap between adjacent ends of longitudinally aligned modesty panels which are dependently supported by two longitudinally aligned elongate members.

FIGS. 23 and 24 show a gap filler trim piece 324 which is configured to cover a gap between adjacent ends of longitudinally aligned modesty panels 130 which are dependently supported by adjacently disposed, longitudinally aligned elongate members 40. Trim piece 324 is preferably a unitary part which covers both sides of the powerway/cableway. Trim piece 324 includes first and second C-shaped hook portions 325 which are configured to be received within recesses or grooves 320 defined by connector elements 321 at opposite sides of elongate member 40. Trim piece 324 is installed by positioning it directly beneath the adjacently aligned elongate member 40 and modesty panels 130, with the open top end of the trim piece facing the bottom of the modesty panel 130, and sliding the trim piece upwardly, and guiding hook portions 325 into recesses 320.

Figure 25:
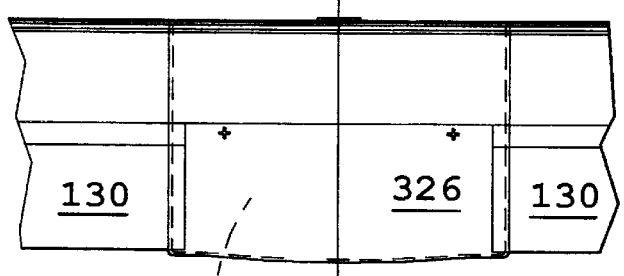
FIG. 25 is a fragmentary side elevational view of an infeed trim piece configured to cover an infeed gap between spaced apart modesty panels dependently supported from longitudinally aligned elongate members.
Figure 26:
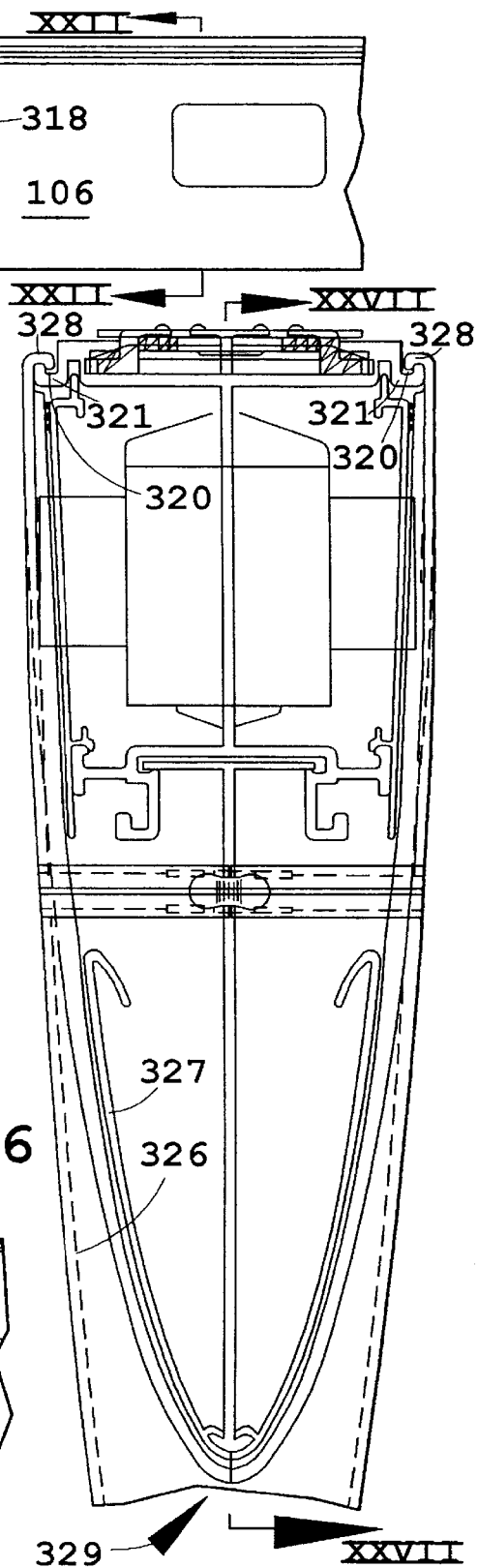
FIG. 26 is a transverse cross sectional view along lines XXVI—XXVI of FIG. 25.

In FIGS. 25, 26 and 27, there is shown an infeed trim piece 326 which is configured to cover an infeed gap 327 defined by longitudinally spaced apart modesty panels 130 which are dependently supported from longitudinally aligned, adjacent elongate members 40. Infeed trim piece 326 is preferably a unitary part which extends downwardly from both sides of the elongate member 40 and conceals the infeed gap 327 from view from either side of the powerway/cableway. Infeed trim piece 326 includes first and second C-shaped hook portions 328 which are configured to engage recesses 320 defined by connector elements 321 on each side of elongate member 40. Infeed trim piece 326 includes a bottom opening 329 (FIG. 26) which allows conduits 330 (FIG. 27) or cables to be fed through a section of the bottom flange 52 and web 50 of elongate member 40 which defines and opening into the powerway/cableway comprising elongate members 40 and modesty panels 130. In FIG. 28, there is shown a further application of the infeed trim piece 326 for concealing an infeed gap 331 defined by a terminal elongate member 40, modesty panel 130, which is supported by elongate member 40 and which terminates beneath the elongate member a distance longitudinally spaced from the termination of the elongate member, and an end cap 332. In either of these situations illustrated in FIGS. 25–28, infeed trim piece 326 is installed by positioning the trim piece directly beneath the elongate member and the end of modesty panel 130, with the open upper end of the trim piece 326 facing upwardly, and raising the trim piece directly upwardly and guiding C-shaped hook portions 328 into recesses 320.

In FIGS. 29–33, there is shown an end cap 333 which is configured to cover the end of a powerway/cableway comprising an elongate member 40 and a trough 12 mounted laterally adjacent to the elongate member. The end cap 333 includes an end wall 334 which is configured to cover the area generally bounded by the ends of elongate member 40 and trough 12. A horizontal support wall 335 projects orthogonally from end wall 334 to provide means for supporting the end cap on the powerway/cableway. As shown in FIG. 33, support wall 335 rests on top flange 42 of elongate member 40. Additional support for end cap 333 is provided by arcuate trough engaging support wall 336 which rest upon the inner surface of the edge of trough 12. Closure panel engaging walls 337 and 338 project orthogonally from end wall 334 and engage closure panels 106 to provide additional support for end cap 333 and to facilitate proper alignment of the end cap during installation. In order to enhance the connection between end cap 333 and the powerway/cableway, a plurality of laterally spaced apart vertical walls 339 project upwardly from the support wall and frictionally engage supporting worksurface 340. End cap 333 is installed by aligning walls 335, 336, 337 and 338 of the end cap above upper flange 42, and the inner surfaces of trough 12 and closure panels 106, respectively; and urging end cap 333 toward the edges of the powerway/cableway, preferably until end wall 334 is in engagement with the ends of trough walls and elongate member 40.

End cap 332, which is configured to cover the end of a powerway/cableway comprising an elongate member and a dependently supported modesty panel, is shown in FIGS. 34–38. End cap 332 includes an end wall 341 and a horizontal support wall 342 which rest upon upper flange 42 of elongate member 40 (FIG. 38). Support wall 342 is substantially identical to support wall 335 of end cap 333, and includes laterally spaced apart vertical walls 343 which project upwardly from support wall 342 and frictionally engage worksurface 344. Also projecting orthogonally from end wall 341 are arcuate modesty panel engaging support walls 345 and closure panel engaging walls 346. Walls 345 and 346 provide additional support and stability for mounting end cap 332 at the end of a powerway/cableway comprising an elongate member 40 and a dependently supported modesty panel 130. Walls 345 and 346 also facilitate proper alignment of end cap 332 with the end of the powerway/cableway. End cap 332 is mounted to a powerway/cableway in a manner generally analogous to that previously described with respect to end cap 333.

An end cap 347 configured for covering the end of a powerway/cableway comprising an elongate member 40 and closure panels 106 supported on opposite sides of the elongate member is shown in FIGS. 41–43. End cap 347 includes an end wall 348 which is configured to cover the area generally defined by the edges of the elongate member 40 and closure panels 106. Projecting orthogonally from the end wall 348 is a horizontal support wall 349 which rest upon top flange 42 of elongate member 40 to support end cap 347 on the powerway/cableway. Horizontal support wall 349 is substantially identical to horizontal support walls 342 and 335 of end caps 332 and 333, respectively. A plurality of laterally spaced apart vertical walls 350 project upwardly from horizontal support wall 349 to engage the underside of worksurface 351. Frictional engagement between vertical walls 350 (as well as the analogous vertical walls 343 and 339 of end caps 332 and 333, respectively) and a worksurface is intended to encompass engagement between mounting blocks or other structure disposed between the vertical walls and a worksurface or other support surface. While end cap 347 is primarily supported by support wall 349 and vertical walls 350, connection between end cap 347 and a powerway/cableway is further facilitated and enhanced by closure panel engaging walls 352. Installation of end cap 347 is achieved in a manner generally analogous to the installation technique previously described with respect to end cap 333.

FIGS. 44 and 45 show a powerway/cableway mounted to the upper side of a worksurface 352. The powerway/cableway shown in FIGS. 44 and 45 is similar to the powerway/cableway shown in FIGS. 42 and 43, except that the various components including elongate member 40, closure panels 106 and end cap 347 are all inverted (i.e., rotated 180° and installed upside down), and the powerway/cableway of FIGS. 44 and 45 further comprises a top cap 353. Top cap 353 is configured to provide an aesthetically acceptable covering or top surface for closing off the area between the upper ends 354' of closure panels 106 and concealing flange 52 of elongate member 40, including the various connectors 54 and hooks 92 thereof. A pair of laterally spaced apart resiliently biased walls 354 extend downwardly from top wall 355 of top cap 353. Walls 354 are resiliently biased to be urged against J-shaped hooks 92 which extend upwardly (with respect to the orientation shown in FIGS. 44 and 45) from flange 52. Tabs 356 project from a lower portion of walls 354 into grooves 357 defined by flange 52 and J-shaped hook 92 extending therefrom. Engagement between tabs 356 and grooves 357 provide a secure snap-type connection between the top cap 353 and the elongate member 40.

The elongate member 40 is most preferably made of extruded aluminum and includes access holes for electrical junction blocks. Mounting plates 313 (FIGS. 16 and 17) are preferably affixed to the under side of a worksurface using double sided tape. The mounting blocks 309 are preferably attached with a screw to the support surface, the screw extending through an elongate aperture 358 through mounting block 309 and through a circular aperture 359 through mounting plate 313. Elongate aperture 358 allows precise adjustment of the alignment of elongate members 40 mounted on adjacent connected worksurfaces. Closure panels 106 are preferably made of an extruded plastic material such as polyvinyl chloride.

The modular power and cable distribution system of this invention can be installed on generally any planar support surface. The system offers a solution for bring electrical distribution and wire management to tables and other furnishings, whether or not they include pre-installed or integral distribution systems. The modular construction allows a variety of configurations tailored to specific applications including power only, cable only, and both power and cable. A single power-in source can provide electricity to a series of linked worksurfaces. Installation requires only a screwdriver for initial attachment of the mounting blocks. All other components snap on and off for ease of reconfiguration or storage.

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A modular power and cable distribution system dependently supportable from an underside of a worksurface of an article of furniture comprising:
   an elongate member having a top flange which is configured to be dependently supported from the worksurface, a vertical web extending downwardly from the top flange, and a bottom flange, the bottom flange including a connector; and
   a trough detachably supported on the connector laterally adjacent to the elongate member, and an end cap secured to an end of the modular power and cable distribution system, the end cap being configured to cover the end of the modular power and cable distribution system defined by the elongate member and the trough.

2. A modular power and cable distribution system comprising:
   an elongate member having a top flange which is configured to be mounted to a worksurface, a vertical web extending downwardly from the top flange, and a bottom flange, the bottom flange including a connector configured to detachably support at least one of a trough mounted laterally adjacent to the elongate member, a closure panel which together with the elongate member defines an enclosed powerway, and a modesty panel dependently supported from the elongate member;
   a trough detachably supported laterally adjacent to the elongate member; and
   an end cap secured to an end of the modular power and cable distribution system, the end cap being configured to cover the end of the modular power and cable distribution system defined by the elongate member and the trough, the end cap including an end wall which is transverse to the longitudinal direction of the elongate member and includes a horizontal support wall projecting from the end wall, the support wall resting on the top flange of the elongate member and being disposed between the top flange of the elongate member and a worksurface to which the top flange is mounted.

3. The modular power and cable distribution system of claim 2 further comprising a plurality of laterally spaced apart vertical walls projecting upwardly from the support wall and frictionally engaging the worksurface.

4. A modular power and cable distribution system dependently supportable from an underside of a worksurface of an article of furniture comprising:
   an elongate member having a top flange which is configured to be dependently supported from the worksurface, a vertical web extending downwardly from the top flange, and a bottom flange, the bottom flange including a connector;
   a closure panel detachably supported on the connector; and
   an end cap supported on an end of the modular power and cable distribution system, the end cap being configured to cover the end of the modular power and cable distribution system defined by the elongate member and the closure panel.

5. A modular power and cable distribution system comprising:
   an elongate member having a top flange which is configured to be mounted to a worksurface, a vertical web extending downwardly from the top flange, and a bottom flange, the bottom flange including a connector configured to detachably support at least one of a trough mounted laterally adjacent to the elongate member, a closure panel which together with the elongate member defines an enclosed powerway, and a modesty panel dependently supported from the elongate member;
   a closure panel detachably supported by the elongate member; and
   an end cap supported on an end of the modular power and cable distribution system, the end cap being configured to cover the end of the modular power and cable distribution system defined by the elongate member and the closure panel, the end cap including an end wall which is transverse to the longitudinal direction of the elongate member and includes a horizontal support wall projecting from the end wall, the support wall resting on the top flange of the elongate member and being disposed between the top flange of the elongate member and a worksurface to which the top flange is mounted.

6. The modular power and cable distribution system of claim 5, further comprising a plurality of laterally spaced apart vertical walls projecting upwardly from the support wall and frictionally engaging the worksurface.

7. A modular power and cable distribution system dependently supportable from an underside of a worksurface of an article of furniture, comprising;
   an elongate member having a top flange which is configured to be dependently supported from the worksurface, a vertical web extending downwardly from the top flange, and a bottom flange, the bottom flange including a connector;
   a modesty panel dependently and detachably supported by the elongate member;
   and an end cap supported on an end of the modular power and cable distribution system, the end cap being configured to cover the end of the modular power and cable distribution system defined by the elongate member and the modesty panel.

8. The modular power and cable distribution system of claim 7 wherein the modesty panel includes at least one end which terminates between the ends of the elongate member, and the end of the modesty panel and one of the ends of the elongate member defining an infeed space therebetween and below the elongate member for feeding cable into the power and cable distribution system.

9. The modular power and cable distribution system of claim 8, further comprising an infeed trim piece attached to the top flange of the elongate member, the infeed trim piece being configured to cover the infeed space below the elongate member.

10. The modular power and cable distribution system of claim 9, wherein the infeed trim piece includes a bottom aperture for feeding cables into the modular power and cable distribution system.

11. The modular power and cable distribution system of claim 10, wherein the infeed trim piece is a unitary part extending downwardly from a first side of the elongate member, around the end of the modesty panel and upwardly to the side of the top flange opposite the first side thereof.

12. The modular power and cable distribution system of claim 10, wherein a section of the bottom flange and web of the elongate member define an opening for feeding cable into a powerway defined by the elongate member.

13. The modular power and cable distribution system of claim 12, wherein the opening is located above the infeed space.

14. A modular power and cable distribution system comprising:
   an elongate member having a top flange which is configured to be mounted to a worksurface, a vertical web extending downwardly from the top flange, and a bottom flange, the bottom flange including a connector configured to detachably support at least one of a trough mounted laterally adjacent to the elongate member, a closure panel which together with the elongate member defines an enclosed powerway, and a modestly panel dependently supported from the elongate member;
   a modesty panel dependently and detachably supported by the elongate member; and
   an end cap supported on an end of the modular power and cable distribution system, the end cap being configured to cover the end of the modular power and cable distribution system defined by the elongate member and the modesty panel, the end cap including an end wall which is transverse to the longitudinal direction of the elongate member and includes a horizontal support wall projecting from the end wall, the support wall resting on the top flange of the elongate member and being disposed between the top flange of the elongate member and a worksurface to which the top flange is mounted.

15. The modular power and cable distribution system of claim 14 further comprising a plurality of laterally spaced apart vertical walls projecting upwardly from the support wall and frictionally engaging the worksurface.

16. A modular power and cable distribution system comprising:
   first and second longitudinally aligned elongate members, each having a first flange mounted to a worksurface, a vertical web, and a second flange, the web having opposite ends, the first flange connected to one end of the web, the second flange connected to the other end of the web;
   one of the flanges of each of the first and second longitudinally aligned elongate members defining opposing, longitudinally extending spaced apart channels; and
   an alignment member having opposite side flanges which are received within the spaced apart channels of each of the elongate members, the alignment member facilitating and maintaining proper alignment of the elongate members.

17. The modular power and cable distribution system of claim 16, wherein the alignment member is divided into longitudinally adjacent sections, including a first section defining the flanges which are received within the spaced apart channels of the first elongate member and a second section having the flanges which are received within the spaced apart channels of the second elongate member the first section including a portion between the edges thereof which is vertically thicker than the other section, whereby a surface of the thicker section engages an adjacent surface of one of the flanges of the first elongate member or the worksurface to cause the first section of the alignment member to be more firmly held to the first elongate member than the second section is held to the second elongate member.

18. The modular power and cable distribution system of claim 17, wherein the engaging surface of the first section of the alignment member includes a plurality of projecting ribs which engage the adjacent surface of one of the flanges of the first elongate member or the worksurface.

19. The modular power and cable distribution system of claim 16 further comprising a trough detachably supported laterally adjacent to each of the elongate members, the troughs being adjacent to each other and longitudinally aligned; and a gap filler trim piece attached to the longitudinally aligned troughs, the trim piece being configured to cover a gap between adjacent ends of the longitudinally aligned troughs.

20. The modular power and cable distribution system of claim 16 further comprising a closure panel detachably supported by each of the elongate members, the closure panels being adjacent to each other and longitudinally aligned; and a gap filler trim piece attached to the first flanges of the elongate members, the trim piece being configured to cover a gap between adjacent ends of the longitudinally aligned closure panels.

21. The modular power and cable distribution system of claim 16 further comprising a modesty panel dependently supported by each of the elongate members, the modesty panels being adjacent to each other and longitudinally aligned with each other; and a gap filler trim piece covering a gap between adjacent ends of the longitudinally aligned modesty panels.

22. A modular power and cable distribution system comprising:
   first and second longitudinally aligned elongate members, each having a top flange mounted to a worksurface, a vertical web extending downwardly from the top flange, and a bottom flange;
   a modesty panel dependently supported from each of the longitudinally aligned elongate members, the modesty panels being longitudinally aligned and longitudinally spaced apart from each other to form a cable infeed gap; and
   an infeed trim piece attached to the top flanges of the elongate members, the infeed trim piece being configured to cover the infeed gap between the spaced apart modesty panels.

23. The modular power and cable distribution system of claim 22, wherein the infeed trim piece includes a bottom aperture for feeding cables into the modular power and cable distribution system.

24. The modular power and cable distribution system of claim 23, wherein the infeed trim piece is a unitary part which extends downwardly from a first side of the top flange of the first elongate member, around the adjacent spaced apart ends of the modesty panels and upwardly to the side of the top flange of the first elongate member which is opposite the first side thereof.

25. The modular power and cable distribution system of claim 23, wherein a section of the bottom flange and web of at least one of the elongate members defines an opening for feeding cable into a powerway defined by the elongate members.

26. The modular power and cable distribution system of claim 25, wherein the opening is located above the infeed gap.

* * * * *

UNITED STATES PATENT AND TRADEMARK OFFICE
CERTIFICATE OF CORRECTION

PATENT NO. : 5,971,509
DATED : October 26, 1999
INVENTOR(S) : Deimen, et. al.

It is certified that error appears in the above-identified patent and that said Letters Patent is hereby corrected as shown below:

Column 3, line 51:

"layed" should be - -laid- -;

Column 4, line 2:

Before "gap" insert - -a- -;

Column 4, line 31:

"elevation" should be - -elevational- -;

Column 4, line 35:

"a elongate" should be - -an elongate- -;

Column 4, line 66:
Column 4, line 67:

Before "FIG. 39" insert - -of- -;

Column 5, line 3:

After "comprising" insert - -an elongate member and closure - -;

Column 8, line 41:

"FIG. 1" should be - -FIG. 11- -;

Column 9, line 63:

"addition" should be - -additional- -;

Column 10, line 5:

"layed" should be - - laid- -;

UNITED STATES PATENT AND TRADEMARK OFFICE
CERTIFICATE OF CORRECTION

PATENT NO. : 5,971,509
DATED : October 26, 1999
INVENTOR(S) : Deimen, et. al.

It is certified that error appears in the above-identified patent and that said Letters Patent is hereby corrected as shown below:

Column 12, line 4:

Delete "Section 301 of";

Column 12, line 23:

"rest" should be - -rests- -;

Column 12, line 30:

"provide" should be - - provides- -;

Column 13, line 39:

"rest" should be - -rests- -;

Column 15, line 5:

"bring" should be - -bringing- -.

Signed and Sealed this

Twenty-fifth Day of July, 2000

Attest:

Attesting Officer

Q. TODD DICKINSON

Director of Patents and Trademarks